(12) United States Patent
Takei

(10) Patent No.: US 10,630,370 B2
(45) Date of Patent: Apr. 21, 2020

(54) TRANSMITTER AND RECEIVER

(71) Applicant: HITACHI, LTD., Tokyo (JP)

(72) Inventor: Ken Takei, Tokyo (JP)

(73) Assignee: HITACHI, LTD., Tokyo (JP)

(*) Notice: Subject to any disclaimer, the term of this patent is extended or adjusted under 35 U.S.C. 154(b) by 0 days.

(21) Appl. No.: 15/761,225

(22) PCT Filed: May 9, 2017

(86) PCT No.: PCT/JP2017/017487
§ 371 (c)(1),
(2) Date: Mar. 19, 2018

(87) PCT Pub. No.: WO2017/195761
PCT Pub. Date: Nov. 16, 2017

(65) Prior Publication Data
US 2018/0262260 A1 Sep. 13, 2018

(30) Foreign Application Priority Data

May 10, 2016 (JP) .................. 2016-094205

(51) Int. Cl.
*H04B 7/10* (2017.01)
*H04J 11/00* (2006.01)
(Continued)

(52) U.S. Cl.
CPC ............. *H04B 7/10* (2013.01); *H04B 7/06* (2013.01); *H04J 11/00* (2013.01);
(Continued)

(58) Field of Classification Search
CPC ......... H04B 7/10; H04B 7/06; H04J 13/0003; H04J 13/004; H04J 13/18; H04J 11/00; H01Q 21/245; H01Q 3/2605
See application file for complete search history.

(56) References Cited

U.S. PATENT DOCUMENTS 5,038,150 A 8/1991 Bains
2004/0252629 A1* 12/2004 Hasegawa ............... H04L 5/026
370/208
(Continued)

FOREIGN PATENT DOCUMENTS

CN 1445937 A 10/2003
CN 103873122 A 6/2014
(Continued)

OTHER PUBLICATIONS

International Search Report, dated Aug. 1, 2017, which issued during the prosecution of International Application No. PCT/JP2017/017487, which corresponds to the present application.
(Continued)

*Primary Examiner* — Sam K Ahn
*Assistant Examiner* — Amneet Singh
(74) *Attorney, Agent, or Firm* — Baker Botts L.L.P.

(57) ABSTRACT

A transmitter includes: a first transmission block that generates a first radio wave having an information signal modulated thereon and having a plane of polarization that rotates; and a second transmission block that generates a second radio wave having the information signal modulated thereon and having a plane of polarization that is fixed. A receiver includes: a first receive section that demodulates a first radio wave having an information signal modulated thereon and having a plane of polarization that rotates; and a second receive section that demodulates a second radio wave having the information signal modulated thereon and having a plane of polarization that is fixed. The receiver restores the information signal on the basis of the result of reception by the first receive section and the second receive section.

5 Claims, 13 Drawing Sheets

(51) Int. Cl.
*H04J 13/18* (2011.01)
*H04J 13/00* (2011.01)
*H04B 7/06* (2006.01)

(52) U.S. Cl.
CPC ........ *H04J 13/0003* (2013.01); *H04J 13/004* (2013.01); *H04J 13/18* (2013.01)

(56) References Cited

U.S. PATENT DOCUMENTS

| | | |
|---|---|---|
| 2006/0222101 A1 | 10/2006 | Cetiner et al. |
| 2007/0035463 A1 | 2/2007 | Hirabayashi |
| 2009/0058725 A1* | 3/2009 | Barker ................. H04B 7/0408 342/372 |
| 2011/0007758 A1 | 1/2011 | Macrae |
| 2013/0072240 A1 | 3/2013 | Macrae |
| 2013/0072247 A1* | 3/2013 | Park ..................... H04B 7/0408 455/513 |
| 2016/0255499 A1* | 9/2016 | Takei ....................... H04B 7/10 455/410 |

FOREIGN PATENT DOCUMENTS

| | | |
|---|---|---|
| JP | H08-065225 A | 3/1996 |
| JP | 2006-340234 A | 12/2006 |
| JP | 2008-527950 A | 7/2008 |
| JP | 2012-049740 A | 3/2012 |

OTHER PUBLICATIONS

Search Report and Written Opinion, dated Jun. 19, 2018, which issued during the prosecution of Singapore Patent Application No. 11201802305Q, which corresponds to the present application.

* cited by examiner

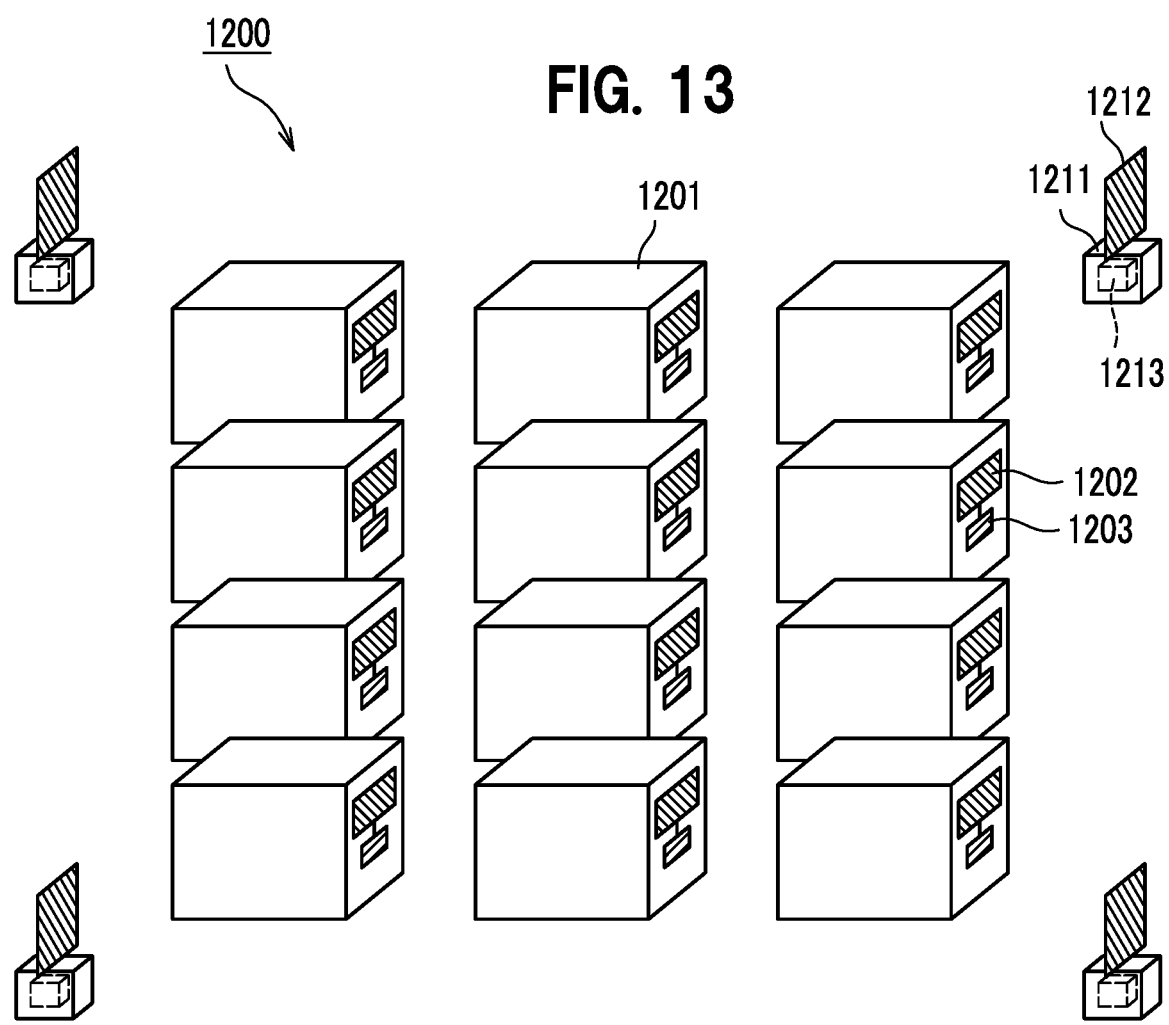

TRANSMITTER AND RECEIVER

CROSS REFERENCE TO PRIOR APPLICATIONS

This application is a U.S. National Phase application under 35 U.S.C. § 371 of International Application No. PCT/JP2017/017487, filed on May 9, 2017, which claims benefit of priority to Japanese Application No. 2016-094205, filed on May 10, 2016. The International Application was published in Japanese on Nov. 16, 2017 as WO 2017/195761 A1 under PCT Article 21(2). The contents of the above applications are hereby incorporated by reference.

TECHNICAL FIELD

The present invention relates to a transmitter and a receiver.

BACKGROUND ART

When a transmitter and a receiver communicate with each other by radio communication and a radio wave scatterer that reflects and/or diffracts electromagnetic waves is present between the transmitter and the receiver, a plurality of radio propagation paths are formed between the transmitter and the receiver. When the plurality of radio propagation paths is simply used together, the radio communication is interrupted when any one of the propagation paths is altered by being affected naturally or artificially. For this reason, it is desirable to eliminate the correlation of the plurality of radio propagation paths.

For example, Patent Literature 1 listed below states that "According to the present invention, in connection with a demodulation system of MIMO-OFDM transmission, when performing MIMO-OFDM transmission using multiple transmission antennas and reception antennas in an outdoor line-of-sight environment by assigning different polarizations such as orthogonal polarizations to respective transmission antennas and reception antennas, using a cross polarization power ratio measured on a receiver in adjusting XPD of transmission antennas of the transmitter and the receiver efficiently reduces correlation of propagation paths and inhibits the reduction of the effect of receive diversity, which is due to the use of polarized waves, to improve the MIMO-OFDM transmission characteristics" (see paragraph 0022).

PRIOR ART DOCUMENT

Patent Document

Patent document 1: Japanese Patent Application Publication No. 2012-49740

SUMMARY OF THE INVENTION

Problems to be Solved by the Invention

According to the technique disclosed in Patent Literature 1, correlation of a plurality of radio propagation paths can be reduced to a certain degree. However, in the technique disclosed in Patent Literature 1, as the transmitter and the receiver use the plurality of propagation paths together, there is limitation in the ability of inhibiting correlation of the plurality of radio propagation paths, and appropriate communication is not always achieved. The present invention is made in view of the above-described circumstances, and it is an object of the present invention to provide a transmitter and a receiver that achieve appropriate communication.

Solution to Problem

To solve the above-described problem, the present invention provides a transmitter including: a first transmission block that generates a first radio wave having an information signal modulated thereon and having a plane of polarization that rotates; and a second transmission block that generates a second radio wave having the information signal modulated thereon and having a plane of polarization that is fixed.

Effects of Invention

The present invention achieves appropriate communication between the transmitter and the receiver.

BRIEF DESCRIPTION OF DRAWINGS

FIG. 13 is a schematic view of a substation system according to a twelfth embodiment of the present invention.

EMBODIMENTS FOR CARRYING OUT THE INVENTION

First Embodiment

Figure 1:
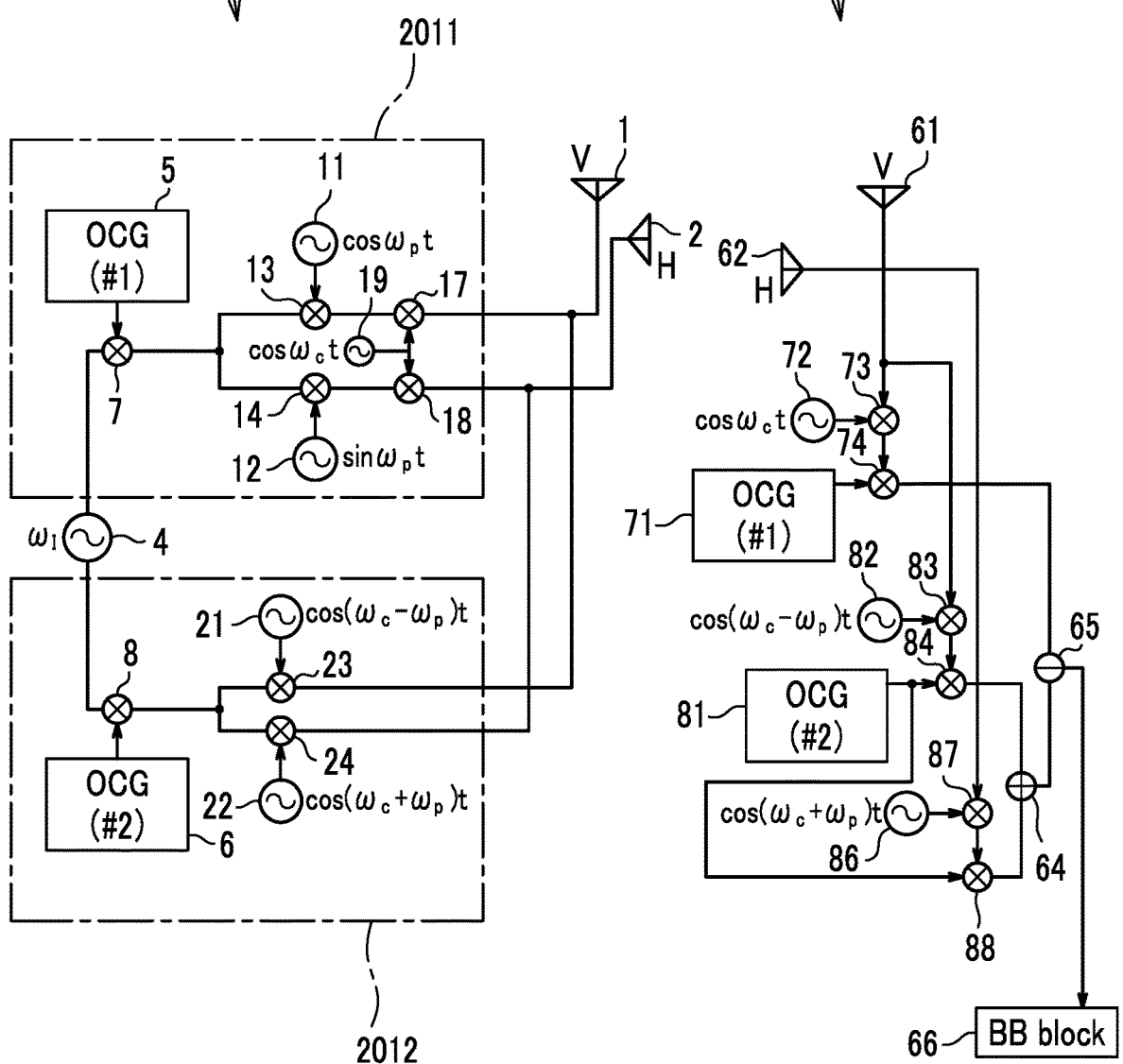
FIG. 1 is a block diagram of a radio communication system according to a first embodiment of the present invention.

FIG. 1 is a block diagram of a radio communication system according to a first embodiment of the present invention. The radio communication system according to the present embodiment includes a transmitter 201 and a receiver 301.

<Transmitter 201>

The transmitter 201 has transmission antennas 1 and 2 which are spatially orthogonal to each other. For example, when the plane of polarization of the transmission antenna 1 is vertical (V), the plane of polarization of the transmission antenna 2 is horizontal (H). The transmitter 201 has an information signal generator 4, a transmission block 2011 (first transmission block), and a transmission block 2012 (second transmission block). The information signal generator 4 outputs an information signal of an angular frequency $\omega_I$, which is to be transmitted to the receiver 301. The transmission blocks 2011 and 2012 modulate the information signal to generate transmission signals in the radio-frequency band, and feed the generated transmission signals to the transmission antennas 1 and 2.

In the transmission block 2011, an orthogonal code generating circuit (denoted OCG in the drawings) 5 outputs an orthogonal code #1 (first orthogonal code), which is a spreading code, and a multiplier 7 (first superimposing circuit) multiplies the orthogonal code #1 by the information signal, to spread the information signal with the orthogonal code #1. Here, a description is given of the term "rotational polarization", which is used in the description below. As polarization of electromagnetic wave, linear polarization and circular polarization are known. A plane defined by the direction of oscillation of the electric field of an electromagnetic wave and the propagation direction of the electromagnetic wave is called plane of polarization. Polarization whose plane of polarization is fixed is called linear polarization. Polarization whose plane of polarization rotates is called circular polarization. Rotational polarization is a kind of circular polarization, and specifically means polarization whose plane of polarization rotates at a rotational frequency lower than the carrier frequency of the electromagnetic wave.

When the rotational angular frequency of the plane of polarization of rotational polarization is $\omega_p$ (rotational frequency; $\omega_p > \omega_I$), and time is t, a polarization rotational frequency cosine oscillator 11 (polarization plane rotating oscillator) outputs $\cos \omega_p t$, and a polarization rotational frequency sine oscillator 12 (polarization plane rotating oscillator) outputs $\sin \omega_p t$. A multiplier 13 multiplies the output signal of the multiplier 7 by $\cos \omega_p t$, and a multiplier 14 multiplies the output signal of the multiplier 7 by $\sin \omega_p t$. When the carrier angular frequency is $\omega_c$ (carrier frequency; $\omega_c > \omega_p$), a carrier frequency cosine oscillator 19 (carrier oscillator) outputs $\cos \omega_c t$.

A multiplier 17 multiplies the output signal of the multiplier 13 by $\cos \omega_c t$, and feeds the result of the multiplication to the transmission antenna 1. A multiplier 18 multiplies the output signal of the multiplier 14 by $\cos \omega_c t$, and feeds the result of the multiplication to the transmission antenna 2. The electromagnetic wave transmitted from the transmission block 2011 via the transmission antennas 1 and 2 is a rotationally polarized electromagnetic wave having the rotational angular frequency $\omega_p$, and propagates an information signal spread with the orthogonal code #1.

In the transmission block 2012, an orthogonal code generating circuit 6 outputs an orthogonal code #2 (second orthogonal code), which is a spreading code, and a multiplier 8 (second superimposing circuit) multiplies the orthogonal code #2 by the information signal. The orthogonal code #1 and the orthogonal code #2 are orthogonal to each other. A carrier frequency cosine oscillator 21 outputs $\cos(\omega_c - \omega_p)t$, and a carrier frequency cosine oscillator 22 outputs $\cos(\omega_c + \omega_p)t$.

A multiplier 23 multiplies the output signal of the multiplier 8 by $\cos(\omega_c - \omega_p)t$. The result of this multiplication is fed to the transmission antenna 1 as a transmission signal whose carrier angular frequency is $\omega_c - \omega_p$. A multiplier 24 multiplies the output signal of the multiplier 8 by $\cos(\omega_c + \omega_p)t$. The result of this multiplication is fed to the transmission antenna 2 as a transmission signal whose carrier angular frequency is $\omega_c + \omega_p$. The electromagnetic waves transmitted from the transmission block 2012 via the transmission antennas 1 and 2 are each a linearly polarized electromagnetic wave with a fixed plane of polarization and each propagate an information signal spread with the orthogonal code #2.

<Receiver 301>

The receiver 301 has spatially orthogonal reception antennas 61 and 62 to receive the electromagnetic waves transmitted from the transmitter 201. For example, when the plane of polarization of the reception antenna 61 is vertical (V), the plane of polarization of the reception antenna 62 is horizontal (H). A multiplier 73 (first receive section) multiplies the reception signal of the reception antenna 61 by $\cos \omega_c t$ outputted from a carrier frequency cosine oscillator 72. A multiplier 74 (first despreading section) multiplies the orthogonal code #1 outputted from an orthogonal code generating circuit 71 (first despreading section) by the output signal of the multiplier 73.

The multiplier 73 demodulate an electromagnetic wave whose carrier angular frequency is $\omega_c$, and the result of the demodulation is despread at the multiplier 74. Here, the electromagnetic wave whose carrier angular frequency is $\omega_c$ is one generated by the transmission block 2011 and rotationally polarized via the transmission antennas 1 and 2. At timings when the plane of polarization of the rotationally polarized electromagnetic wave orthogonally crosses the plane of polarization of the reception antenna 61, the reception antenna 61 cannot receive the rotationally polarized electromagnetic wave, and thus the signals outputted by the multipliers 73 and 74 become substantially zero. Those timings arrive in synchronization with the rotation cycle of the rotational polarization, and thus can each be represented by an "angle of plane of polarization of rotational polarization". Hereinafter, this angle is referred to as "non-detection angle $\theta_z$". The output signal of the multiplier 74 is ideally identical to the original information signal outputted by the information signal generator 4 in the transmitter 201, except at the timings of the non-detection angle $\theta_z$.

A carrier frequency cosine oscillator 82 outputs $\cos(\omega_c - \omega_p)t$, and a multiplier 83 (second receive section) multiplies $\cos(\omega_c - \omega_p)t$ by the reception signal of the reception antenna 61. A multiplier 84 (second despreading section) multiplies the orthogonal code #2 outputted from an orthogonal code generating circuit 81 (second despreading section) by the output signal of the multiplier 83. With this processing, the reception signal received by the reception antenna 61 and having a carrier angular frequency $\omega_c - \omega_p$ is demodulated and despreaded via the multipliers 83 and 84.

A carrier frequency cosine oscillator 86 outputs $\cos(\omega_c + \omega_p)t$, and a multiplier 87 (second receive section) multiplies $\cos(\omega_c + \omega_p)t$ by the reception signal of the reception antenna 62. A multiplier 88 (second despreading section) multiplies the orthogonal code #2 outputted from the orthogonal code generating circuit 81 by the output signal of the multiplier 87. With this processing, the reception signal received by the reception antenna 62 and having a carrier angular frequency $\omega_c + \omega_p$ is demodulated and despreaded via the multipliers 87 and 88.

An adder 64 combines the signals outputted from the multipliers 84 and 88. Accordingly, the combined signal is ideally identical to the information signal originally outputted by the information signal generator 4 in the transmitter 201. The electromagnetic wave having the carrier angular frequency $\omega_c+\omega_p$ and having a fixed plane of polarization as well as the electromagnetic wave having the carrier angular frequency $\omega_c-\omega_p$ and having a fixed plane of polarization propagate an identical information signal with different carrier angular frequencies and different planes of polarization. Accordingly, by separately demodulating and despreading these electromagnetic waves and then combining the resultant signals, the adder 64 is able to continue to output the information signal at a substantially constant strength.

A subtractor 65 subtracts the output signal of the multiplier 74 from the output signal of the adder 64, and outputs the result of the subtraction. As described above, except at the non-detection angle $\theta_z$, the output signal of the multiplier 74 is ideally identical to the original information signal. Accordingly, except at the non-detection angle $\theta_z$, ideally, the output signal of the subtractor 65 is zero. Meanwhile, at the non-detection angle $\theta_z$, the output signal of the multiplier 74 is substantially zero, and thus, ideally, the subtractor 65 outputs the original information signal at the non-detection angle $\theta_z$.

When a baseband block (denoted by "BB Block" in the drawings) 66 receives information signal from the subtractor 65 at the non-detection angle $\theta_z$, the baseband block carries out processing on the basis of the information signal. Note that the non-detection angle $\theta_z$ is not necessarily singular. If a plurality of radio propagation paths are present, a plurality of non-detection angles $\theta_z$ occurs. Those non-detection angles are denoted by $\theta_{z1}, \theta_{z2}, \ldots, \theta_{zn}$. The subtractor 65 outputs information signal at each of the non-detection angles $\theta_{z1}, \theta_{z2}, \ldots,$ and $\theta_{zn}$. In this case, the baseband block 66 extracts information signal correspondingly to the non-detection angles $\theta_{z1}, \theta_{z2}, \ldots,$ and $\theta_{zn}$, and carries out processing on the basis of the information signal at a particular non-detection angle $\theta_{zm}$, where $1 \leq m \leq n$.

Operation of First Embodiment

The electromagnetic wave transmitted from the transmitter 201 is reflected by various radio wave scatterers before reaching the receiver 301. Assuming that a surface of a radio wave scatterer obeys Snell's law of reflection, when an electromagnetic wave is reflected by the surface, the electromagnetic wave undergoes a shift in polarization vector inherent to a normal vector of the surface of the radio scatterer and an incident vector of the electromagnetic wave incident on the surface. The electromagnetic wave reaches the receiver 301 through a plurality of radio propagation paths that cause shifts in polarization vector.

Each of the radio propagation paths generally causes a different inherent polarization shift. The receiver 301 of the present embodiment is capable of selectively extracting only the signal transmitted via an electromagnetic wave having particular polarization (i.e., an electromagnetic wave having a particular non-detection angle $\theta_{zm}$). This is equivalent to selectively capturing only an information signal that has reached the receiver 301 via a particular radio propagation path.

As described above, the present embodiment is capable of extracting information signals transmitted via a plurality of radio propagation paths chronologically according to the non-detection angles $\theta_{z1}, \theta_{z2}, \ldots,$ and $\theta_{zn}$, to capture only an information signal at a particular non-detection angle $\theta_{zm}$. That is, the present embodiment is capable of selecting a particular radio propagation path from a plurality of radio propagation paths, and transmitting the information signal through the selected radio propagation path. This enables the present embodiment to reduce the correlation of the plurality of radio propagation paths and have strong resistance to obstacles and interferences of the plurality of radio propagation paths caused by a natural event or an artificial operation.

Second Embodiment

Figure 2:
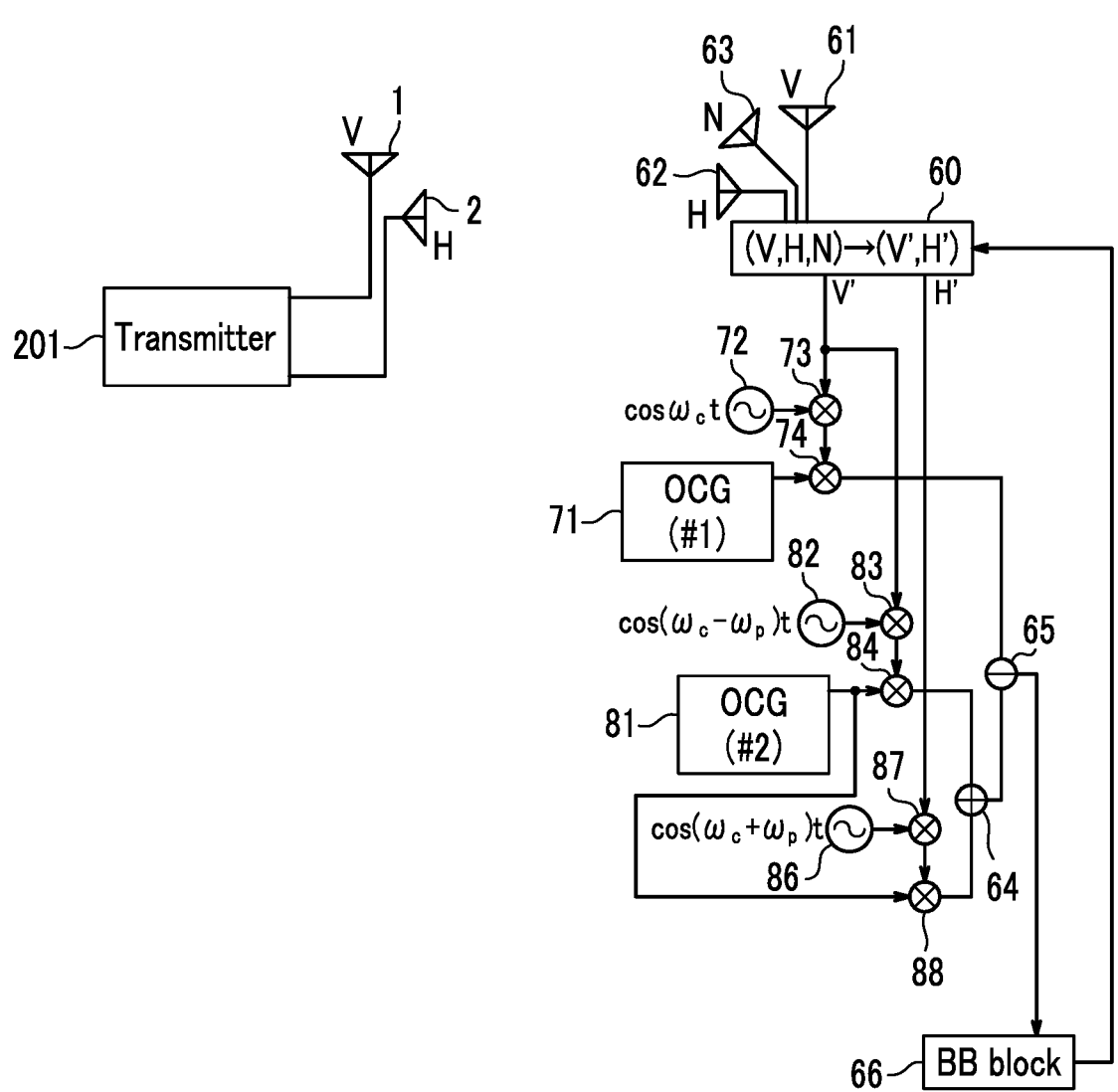
FIG. 2 is a block diagram of a radio communication system according to a second embodiment of the present invention.

FIG. 2 is a block diagram of a radio communication system according to a second embodiment of the present invention. Note that, in FIG. 2, elements corresponding to those shown in FIG. 1 are respectively given the same symbols and duplicated descriptions thereof may be omitted. The radio communication system according to the present embodiment includes the transmitter 201 and a receiver 302. In the present embodiment, the transmitter 201 has the same configuration of that of the first embodiment (see FIG. 1). Thus, a detailed description is given of the configuration of the receiver 302.

The receiver 302 has three reception antennas 61, 62, and 63, which are spatially orthogonal to each other. Three signals received via the three reception antennas 61, 62, and 63 are passed to a polarization rotation circuit 60. The polarization rotation circuit 60 converts the received three signals into two pseudo reception signals (V', H'), which are spatially orthogonal to each other, and outputs the two pseudo reception signals (V', H').

In other words, the polarization rotation circuit 60 applies angular weighting on the three reception signals from the reception antennas 61, 62, and 63, to convert the three reception signals into two pseudo reception signals (V',H'). Angular weighting is, for example, Euler angles such that two linearly polarized antennas are virtually formed in the three dimensional space by the reception antennas 61, 62, and 63, which are spatially orthogonal to one another. That is, the polarization rotation circuit 60 operates so that the receiver 302 virtually forms two spatially orthogonal antennas oriented in a freely-selected direction.

The pseudo reception signals (V') outputted from the polarization rotation circuit 60 are passed to the multipliers 73 and 83. The pseudo reception signal (H') outputted from the polarization rotation circuit 60 is passed to the multiplier 87.

In the receiver 302, the configuration from the multipliers 73, 83, and 87 to the subtractor 65 is the same as that of the first embodiment (see FIG. 1)

The baseband block 66 extracts information signal correspondingly to the non-detection angles $\theta_{z1}, \theta_{z2}, \ldots,$ and $\theta_{zn}$, and carries out processing on the basis of the information signal at a particular non-detection angle $\theta_{zm}$ ($1 \leq m \leq n$) in the same manner as in the first embodiment.

In addition, the baseband block 66 controls the angular weighting of the polarization rotation circuit 60 so that, among the information signals outputted from the subtractor 65, the information signal at the particular non-detection angle $\theta_{zm}$ exhibits good communication quality. A plurality of rotationally polarized electromagnetic waves reaches the receiver 302 via a plurality of radio propagation paths and then are combined. The combined electromagnetic wave has one propagation direction and elliptically rotates at a frequency identical to the frequency of the rotational polarization.

When one of the two antennas virtually formed by the polarization rotation circuit 60 is oriented in that propagation direction, the reception strength of the rotationally polarized wave received by the receiver 302 becomes zero. Meanwhile, when one of the other virtually formed antennas is oriented orthogonal to that propagation direction, the reception strength of the rotationally polarized wave received by the receiver 302 is maximized. The baseband block 66 controls the polarization rotation circuit 60 to set the angular weighting so that a signal with as much intensity as possible (ideally, signal with a maximum intensity) is received by the two antennas virtually formed.

As understood from the above description, the receiver 302 according to the present embodiment is capable of improving receive sensitivity to a particular radio propagation path, and thus is capable of improving the quality of the restored information signal compared to the receiver 301 of the first embodiment.

Third Embodiment

Figure 3:
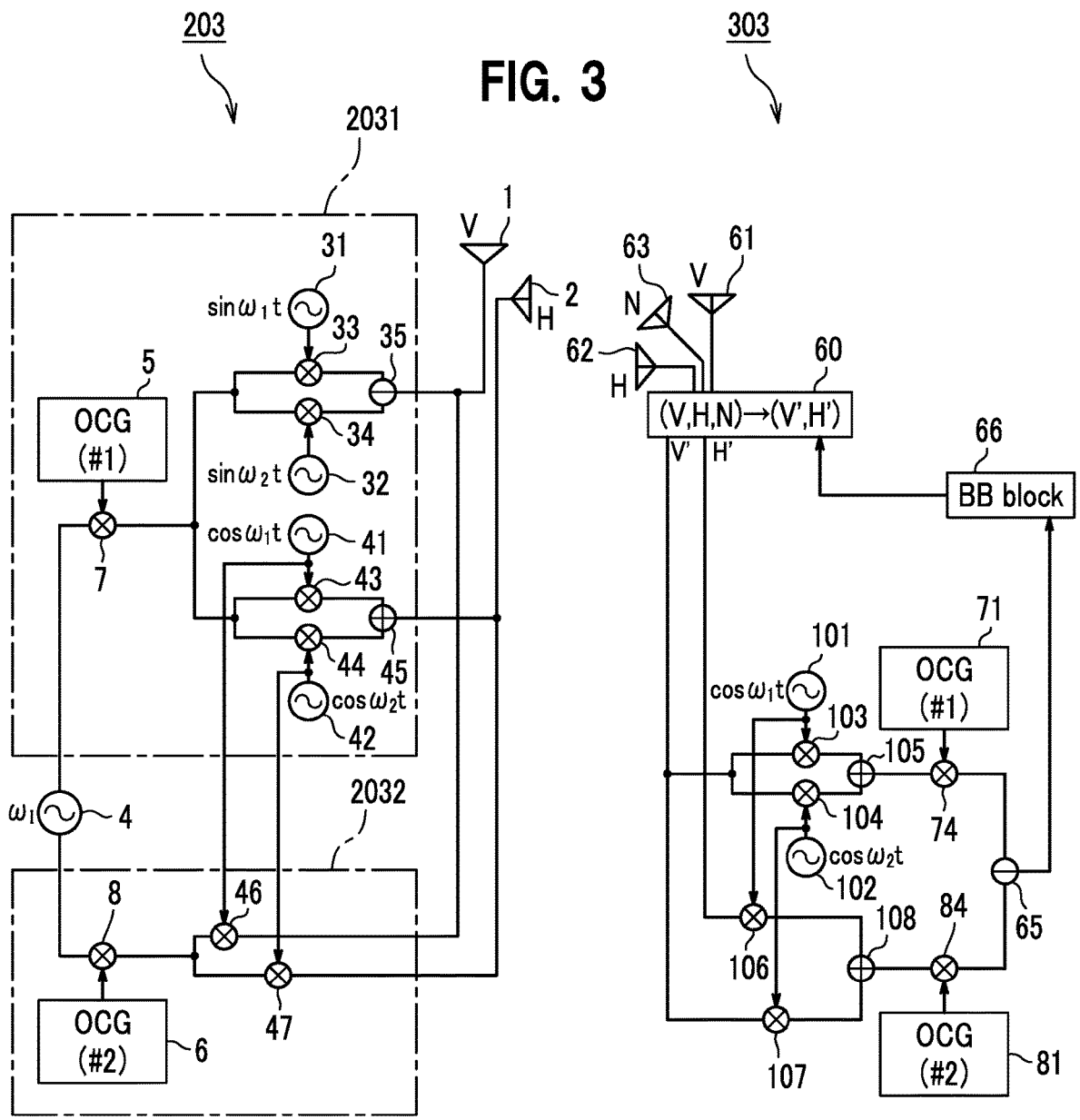
FIG. 3 is a block diagram of a radio communication system according to a third embodiment of the present invention.

FIG. 3 is a block diagram of a radio communication system according to a third embodiment of the present invention. Note that, in FIG. 3, elements corresponding to those shown in FIGS. 1 and 2 are respectively given the same symbols and duplicated descriptions thereof may be omitted.

The radio communication system according to the present embodiment has a transmitter 203 and a receiver 303. The transmitter 203 has two transmission blocks 2031 and 2032 that each receive information signal passed from the information signal generator 4 and feed it to the transmission antennas 1 and 2.

<Transmitter 203>

In the transmission block 2031 of the transmitter 203, the information signal outputted from the information signal generator 4 is spread by the multiplier 7 with the orthogonal code #1. A carrier frequency sine oscillator 31 (first sine oscillator) outputs sin $\omega_1 t$, and a carrier frequency sine oscillator 32 (second sine oscillator) outputs sin $\omega_2 t$. Here, the angular frequency $\omega_1$ (carrier frequency; first frequency) and the angular frequency $\omega_2$ (carrier frequency; second frequency) are carrier angular frequencies close to each other (for example, $\omega_1$ is within plus or minus 10% of $\omega_2$). A multiplier 33 multiplies the output signal of the multiplier 7 by sin $\omega_1 t$, and a multiplier 34 multiplies the output signal of the multiplier 7 by sin $\omega_2 t$. A subtractor 35 subtracts the output signal of the multiplier 34 from the output signal of the multiplier 33, and feeds the result of the subtraction to the transmission antenna 1. As a result, the electromagnetic wave transmitted by the transmission block 2031 via the transmission antenna 1 is a sine beat wave whose beat angular frequency is half the difference between the two angular frequencies $\omega_1$ and $\omega_2$.

Meanwhile, a carrier frequency cosine oscillator 41 (first cosine oscillator) outputs cos $\omega_1 t$, and a carrier frequency cosine oscillator 42 (second cosine oscillator) outputs cos $\omega_2 t$. A multiplier 43 multiplies the output signal of the multiplier 7 by cos $\omega_1 t$, and a multiplier 44 multiplies the output signal of the multiplier 7 by cos $\omega_2 t$. An adder 45 adds up the output signals of the multipliers 43 and 44, and feeds the result of the addition to the transmission antenna 2. As a result, the electromagnetic wave transmitted by the transmission block 2031 via the transmission antenna 2 is a cosine beat wave whose beat angular frequency is half the difference between the two angular frequencies $\omega_1$ and $\omega_2$.

When the electromagnetic waves transmitted by the transmission block 2031 via the transmission antennas 1 and 2 are combined in space, a rotationally polarized electromagnetic wave having a plane of polarization rotating at the above-described beat angular frequency is generated. With this rotationally polarized electromagnetic wave, the information signal spread with the orthogonal code #1 is transmitted.

In the transmission block 2032, the information signal outputted from the information signal generator 4 is spread with the orthogonal code #2 by the multiplier 8. A multiplier 46 multiplies the output signal of the multiplier 8 by cos $\omega_1 t$, and feeds the result of the multiplication to the transmission antenna 1. A multiplier 47 multiplies the output signal of the multiplier 8 by cos $\omega_2 t$, and feeds the result of the multiplication to the transmission antenna 2. The electromagnetic waves transmitted from the transmission block 2032 via the transmission antennas 1 and 2 are each a linearly polarized electromagnetic wave with a fixed plane of polarization, and each propagate an information signal spread with the orthogonal code #2.

<Receiver 303>

A receiver 303 has, similarly to the receiver 302 (see FIG. 2) of the second embodiment, the three reception antennas 61, 62, and 63 which are spatially orthogonal to one another; and the polarization rotation circuit 60 that virtually forms two spatially orthogonal antennas by applying angular weighting on the three reception signals from the reception antennas 61, 62, and 63, to convert the three signals into two pseudo reception signals.

A multiplier 103 multiplies one (V') of the generated two pseudo reception signals by cos $\omega_1 t$ outputted by the carrier frequency cosine oscillator 101. A multiplier 104 multiplies the one (V') of the generated pseudo reception signals by cos $\omega_2 t$ outputted by the carrier frequency cosine oscillator 102. An adder 105 adds up the results of the multiplications by the multipliers 103 and 104. A multiplier 74 multiplies the output signal of the adder 105 by the orthogonal code #1 outputted by the orthogonal code generating circuit 71. With this processing, the information signal spread with the orthogonal code #1 is demodulated and despread.

The two pseudo reception signals outputted from the polarization rotation circuit 60 are respectively passed to multipliers 106 and 107. The multiplier 106 multiplies one (H') of the two pseudo reception signals by cos $\omega_1 t$. The multiplier 107 multiplies the other one (V') of the two pseudo reception signals by cos $\omega_2 t$. An adder 108 adds up the output signals of the multipliers 106 and 107, the multiplier 84 multiplies the result of this addition by the orthogonal code #2 outputted by the orthogonal code generating circuit 81.

With this processing, the information signal spread with the orthogonal code #2 is demodulated and despread.

The subtractor 65 (restoration section) subtracts the output signal of the multiplier 84 from the output signal of the multiplier 74. With this processing, similarly to the first and second embodiments, the subtractor 65 outputs information signal at each of the non-detection angles $\theta_{z1}, \theta_{z2}, \ldots,$ and $\theta_{zn}$. The baseband block 66 functions in the same manner as that of the second embodiment. That is, the baseband block 66 extracts information signals corresponding to the non-detection angles $\theta_{z1}, \theta_{z2}, \ldots,$ and $\theta_{zn}$, and carries out processing on the basis of the information signal at a particular non-detection angle $\theta_{zm}$, where $1 \leq m \leq n$. In addition, the baseband block 66 controls the angular weighting of the polarization rotation circuit 60 so that the information signal outputted from the subtractor 65 at a non-detection angle $\theta_{zm}$ exhibits good communication quality.

The present embodiment uses the angular frequencies $\omega_1$ and $\omega_2$ close to each other instead of the angular frequencies $\omega_c$ and $\omega_p$ used in the second embodiment (see FIG. 2). This facilitates implementing many elements contained in the transmitter 203 and receiver 303 by using digital signal processors (DSP) or the like. This allows the transmitter 203 and the receiver 303 to be reduced in size, and to have reduced changes of circuit elements due to aging and temperature change, and thus to achieve high reliability and a long life span of the device.

Fourth Embodiment

Figure 4:
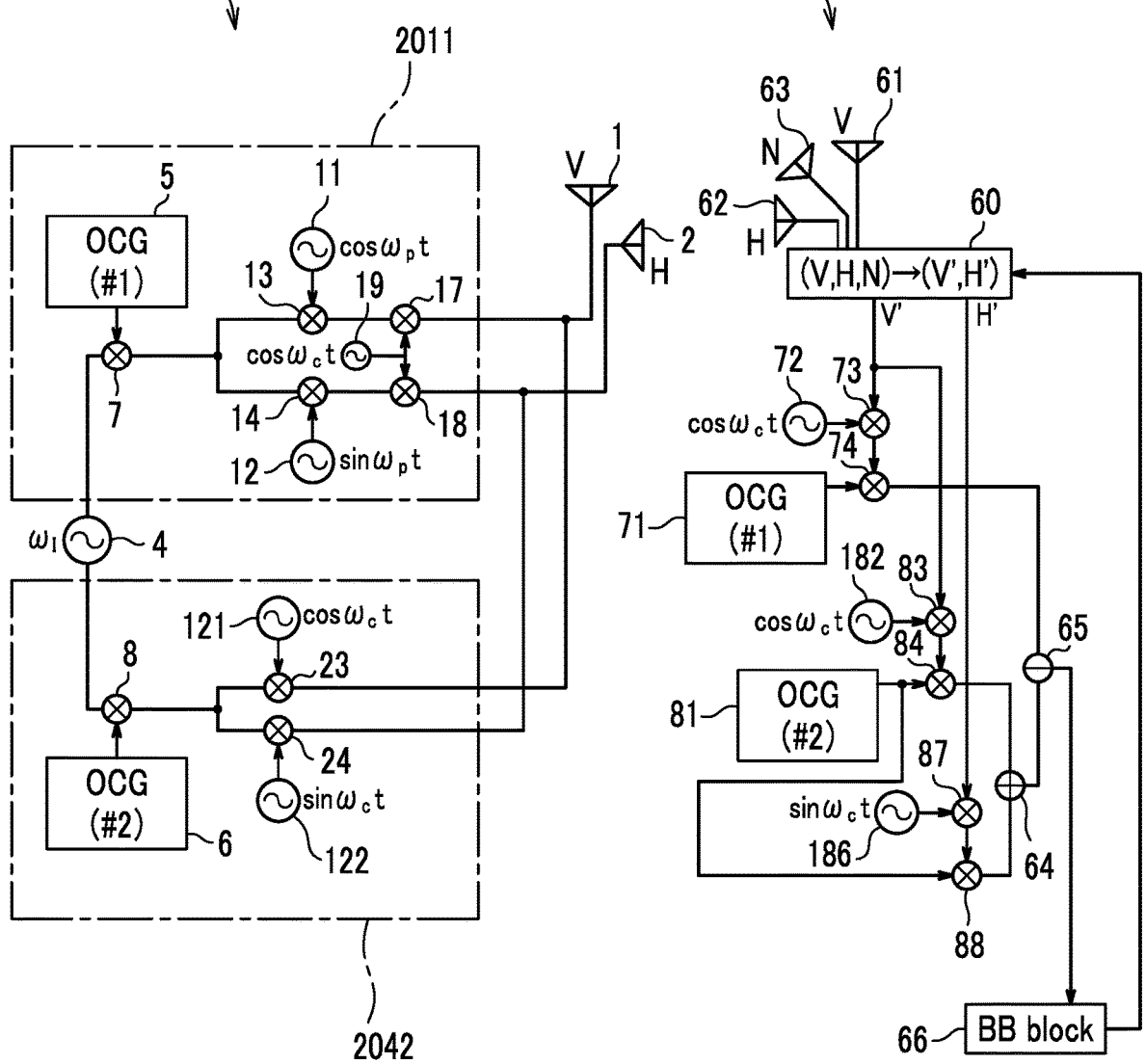
FIG. 4 is a block diagram of a radio communication system according to a fourth embodiment of the present invention.

FIG. 4 is a block diagram of a radio communication system according to a fourth embodiment of the present invention. Note that, in FIG. 4, elements corresponding to those shown in FIGS. 1 to 3 are respectively given the same symbols and duplicated descriptions thereof may be omitted.

The radio communication system according to the present embodiment has a transmitter 204 and a receiver 304. The transmitter 204 has the two transmission blocks 2011 and 2042 that feed information signal passed from the information signal generator 4 to the transmission antennas 1 and 2, respectively.

<Transmitter 204>

First, the transmission block 2011 is the same as that of the first embodiment (see FIG. 1). That is, the transmission block 2011 spreads information signal with the orthogonal code #1 and outputs a rotationally polarized electromagnetic wave whose carrier angular frequency is $\omega_c$ and whose plane of polarization rotates at the rotational angular frequency $\omega_p$, via the transmission antennas 1 and 2. In the transmission block 2042, the information signal outputted from the information signal generator 4 is spread with the orthogonal code #2 by the multiplier 8.

A carrier frequency cosine oscillator 121 outputs cos $\omega_c t$, and a carrier frequency sine oscillator 122 outputs sin $\omega_c t$. The multiplier 23 multiplies the output signal of the multiplier 8 by cos $\omega_c t$. The multiplier 24 multiplies the output signal of the multiplier 8 by sin $\omega_c t$. The output signals of the multipliers 23 and 24 are respectively fed to the transmission antennas 1 and 2. With this processing, the transmission block 2042 transmits temporally orthogonal electromagnetic waves via the transmission antennas 1 and 2 by using the cosine wave cos $\omega_c t$ and the sine wave sin $\omega_c t$. These electromagnetic waves are each a linearly polarized electromagnetic wave with a fixed plane of polarization, and each propagates information signal spread with the orthogonal code #2.

<Receiver 304>

Comparing the configuration of the receiver 304 with that of the receiver 302 of the second embodiment (see FIG. 2), a carrier frequency cosine oscillator 182 is provided in place of the carrier frequency cosine oscillator 82, and a carrier frequency sine oscillator 186 is provided in place of the carrier frequency cosine oscillator 86. The carrier frequency cosine oscillator 182 outputs cos $\omega_c t$, and carrier frequency sine oscillator 186 outputs sin $\omega_c t$. Except these, the configuration of the receiver 304 is the same as that of the receiver 302.

In the present embodiment, the transmitter 204 transmits, via two temporally orthogonal electromagnetic waves each having a fixed plane of polarization, the same information signal to the receiver 304. These two electromagnetic waves are separately demodulated and despread, and then the resulted signals are combined into an information signal via the multipliers 84 and 88 and the adder 64, which allows the adder 64 to continue to output the information signal at a substantially constant strength.

The multiplier 74 outputs an information signal that becomes zero at non-detection angles $\theta_{z1}, \theta_{z2}, \ldots,$ and $\theta_{zn}$, in the same manner as in the first and second embodiments. Accordingly, the subtractor 65 outputs the information signal at each of the non-detection angles $\theta_{z1}, \theta_{z2}, \ldots,$ and $\theta_{zn}$. The baseband block 66 carries out processing on the basis of the information signal at a particular non-detection angle $\theta_{zm}$, and controls the angular weighting of the polarization rotation circuit 60 so that the information signal at the non-detection angle $\theta_{zm}$ exhibits good communication quality.

According to the present embodiment, as the number of used carrier frequencies is smaller than that in the first to third embodiments, the amount of spurious signal caused by nonlinearity of parts of the transmitter 204 can be reduced and thus improvement of radio communication quality can be achieved.

Fifth Embodiment

Figure 5:
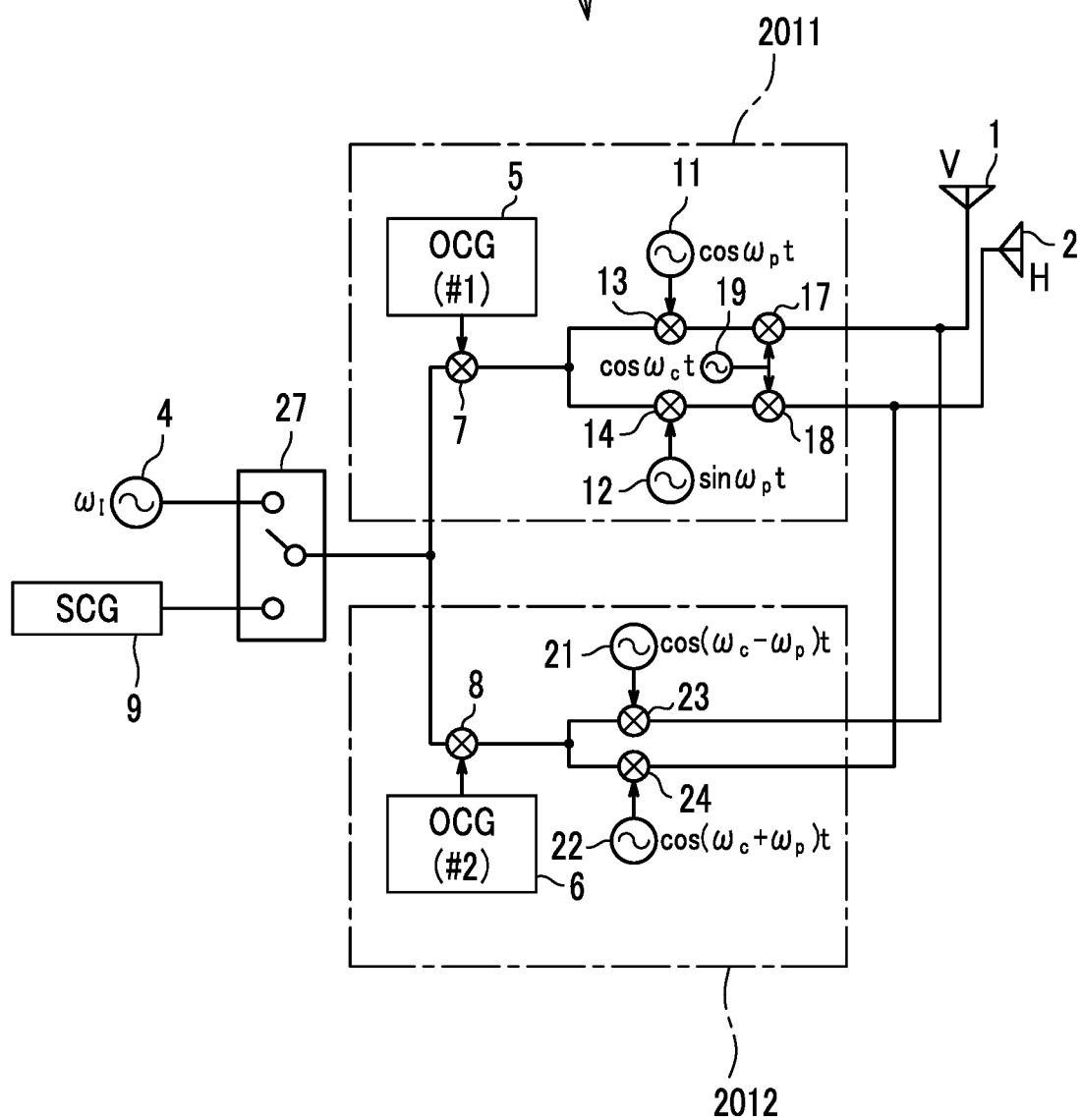
FIG. 5 is a block diagram of a transmitter according to a fifth embodiment of the present invention.

FIG. 5 is a block diagram of a radio communication system according to a fifth embodiment of the present invention. Note that, in FIG. 5, elements corresponding to those shown in FIGS. 1 to 4 are respectively given the same symbols and duplicated descriptions thereof may be omitted. The radio communication system according to the present embodiment has a transmitter 205 and a receiver (not shown). The receiver 301 (see FIG. 1) according to the first embodiment or the receiver 302 (see FIG. 2) according to the second embodiment may be applicable as the receiver for the present embodiment.

The transmitter 205 and the transmitter 201 (see FIG. 1) of the first embodiment are the same in that they have the transmission blocks 2011 and 2012, the transmission antennas 1 and 2, and the information signal generator 4. The transmitter 205 further has a synchronization signal generating circuit (denoted by SCG in the drawings) 9 and a signal switching circuit 27. The synchronization signal generating circuit 9 outputs a predetermined synchronization signal. The signal switching circuit 27 selects one of the information signal outputted by the information signal generator 4 and the synchronization signal outputted by the synchronization signal generating circuit 9, at regular time intervals or at non-regular time intervals, to pass the selected signal to both the transmission blocks 2011 and 2012.

The synchronization signal generated by the synchronization signal generating circuit 9 has strong correlation. Thus, the transmitter and the receiver can establish high-accuracy synchronization therebetween by restoring the synchronization signal in the receiver. In rotational polarization, the polarization varies with time. And thus, when high-accuracy synchronization is established between the transmitter and the receiver, the receiver is able to identify the polarization with high reliability. Each of the plurality of waves reaching the receiver via a different propagation path has undergone a polarization shift inherent to the propagation path. According to the present embodiment, the receiver is able to improve the accuracy of distinguishing between plural waves reaching the receiver on the basis of the polarization of the waves, and thus improve the accuracy of distinguishing between the propagation paths between the transmitter and the receiver. Therefore, the present embodiment improves the robustness against modifications made to radio propagation paths by an outsider.

Sixth Embodiment

Figure 6:
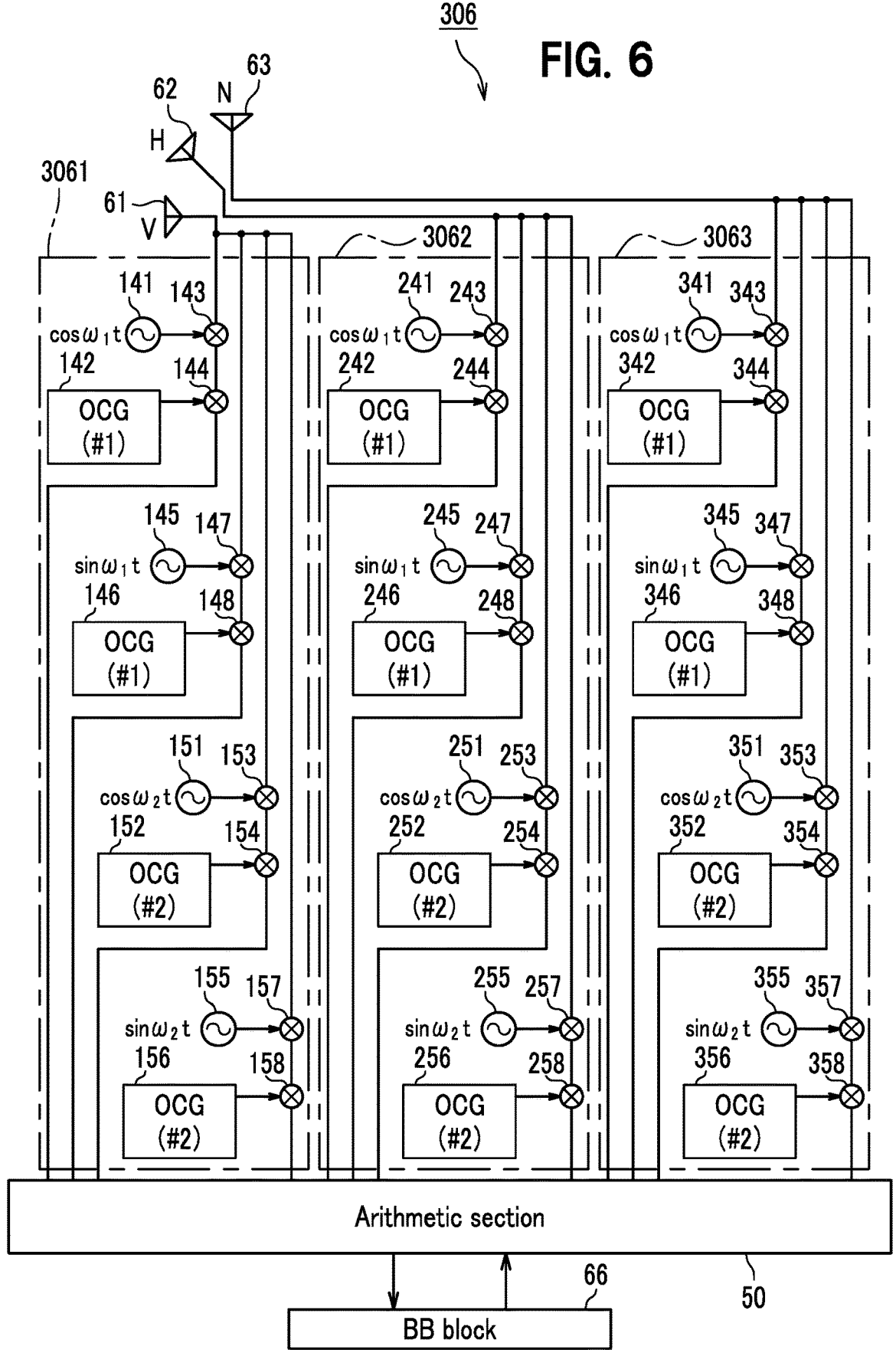
FIG. 6 is a block diagram of a receiver according to a sixth embodiment of the present invention.

FIG. 6 is a block diagram of a radio communication system according to a sixth embodiment of the present invention. Note that, in FIG. 6, elements corresponding to those shown in FIGS. 1 to 5 are respectively given the same symbols and duplicated descriptions thereof may be omitted. The radio communication system according to the present embodiment has the transmitter 203 (see FIG. 3) and a receiver 306. In FIG. 6, illustration of the transmitter 203 is omitted.

The receiver 306 has: the three reception antennas 61, 62, and 63, which are spatially orthogonal to one another; and three receive blocks 3061, 3062, and 3063 which respectively process the reception signals of the reception antennas 61, 62, and 63. In the receive block 3061, cosine oscillators 141 and 151 respectively output cos $\omega_1 t$ and cos $\omega_2 t$, and sine oscillators 145 and 155 respectively output sin $\omega_1 t$ and sin $\omega_2 t$. Orthogonal code generating circuits 142 and 146 each output orthogonal code #1, and orthogonal code generating circuits 152 and 156 each output orthogonal code #2.

The reception signal of the reception antenna 61 is split into four branches, and multipliers 143, 147, 153, and 157 respectively multiply the four signals by cos $\omega_1 t$, sin $\omega_1 t$, cos $\omega_2 t$, and sin $\omega_2 t$. Multipliers 144 and 148 respectively multiply the output signals of the multipliers 143 and 147 by the orthogonal code #1 to restore the information signal. Multipliers 154 and 158 respectively multiply the output signals of the multipliers 153 and 157 by the orthogonal code #2 to restore the information signal. In this manner, the four information signals are generated by the multipliers 144, 148, 154, and 158 and passed to an arithmetic section 50.

The receive block 3062 has: cosine oscillators 241 and 251; sine oscillators 245 and 255; multipliers 243, 244, 247, 248, 253, 254, 257, and 258; orthogonal code generating circuits 242 and 246 that each output the orthogonal code #1; and orthogonal code generating circuits 252 and 256 that each output the orthogonal code #2. These respectively correspond to the cosine oscillators 141 and 151; the sine oscillators 145 and 155; the multipliers 143, 144, 147, 148, 153, 154, 157, and 158; the orthogonal code generating circuits 142 and 146; and the orthogonal code generating circuits 152 and 156 in the above-described receive block 3061. Thus, the receive block 3062 performs the same processing as the processing of the receive block 3061 on the reception signal of the reception antenna 62, to pass four information signals to the arithmetic section 50.

The receive block 3063 has: cosine oscillators 341 and 351; sine oscillators 345 and 355; multipliers 343, 344, 347, 348, 353, 354, 357, and 358; orthogonal code generating circuits 342 and 346 which each output the orthogonal code #1; and orthogonal code generating circuits 352 and 356 which each output the orthogonal code #2. These correspond to the respective elements of the above-described receive block 3061. The receive block 3063 performs the same processing as the processing of the receive block 3061 on the reception signal of the reception antenna 63, to pass four information signals to the arithmetic section 50.

The arithmetic section 50 carries out processing like weighting, addition and subtraction on the 12 (4×3) information signals and passes the result of the processing to the baseband block 66. More specifically, the arithmetic section 50 assumes the functions of the polarization rotation circuit 60, the subtractor 65 and the like in the receiver 303 in the third embodiment (FIG. 3). With this configuration, similarly to the subtractor 65 of the third embodiment, the arithmetic section 50 outputs the information signal at each of the non-detection angles $\theta_{z1}$, $\theta_{z2}$, . . . , and $\theta_{zn}$. The baseband block 66 carries out processing on the basis of the information signal at a particular non-detection angle $\theta_{zm}$, and controls various constants of the arithmetic section 50 so that the information signal at the non-detection angle $\theta_{zm}$ exhibits good communication quality.

FIG. 6 shows 12 pieces of parts each of which has the substantially same configuration as the part consisting of the cosine oscillator 141, the orthogonal code generating circuit 142, and the multipliers 143 and 144. This means that, when constructing the receiver 306 by using a DSP, the receive blocks 3061, 3062, and 3063 can be implemented by looping predetermined microprogram instructions 12 times. As understood from the above, according to the present embodiment, constructing the receiver 306 by using a DSP will reduce the number of microprogram instructions, and thus reduce the amount of memory for storing the microprogram instructions as well as the required design man-hours.

Seventh Embodiment

Figure 7:
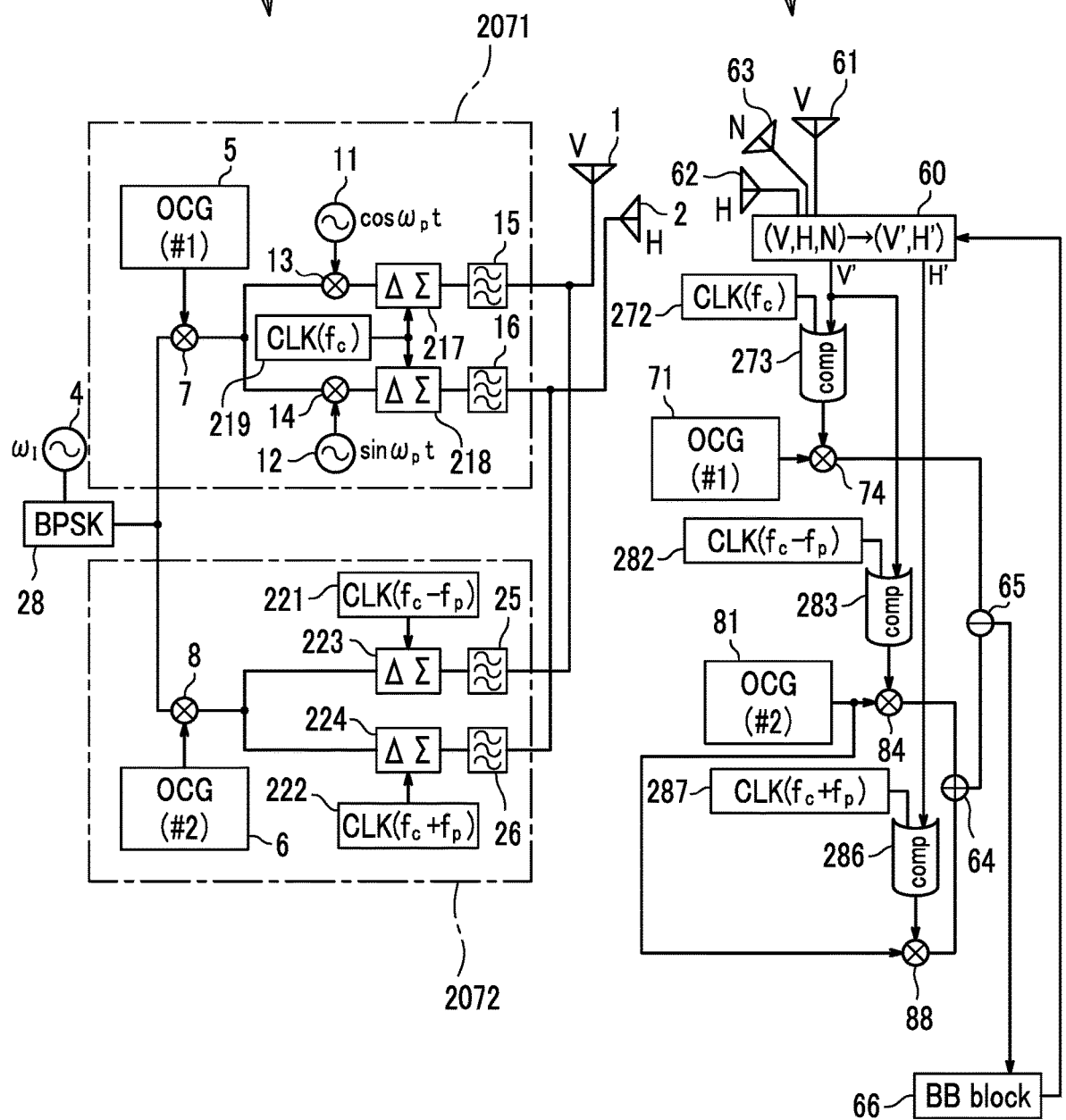
FIG. 7 is a block diagram of a radio communication system according to a seventh embodiment of the present invention.

FIG. 7 is a block diagram of a radio communication system according to a seventh embodiment of the present invention. Note that, in FIG. 7, elements corresponding to those shown in FIGS. 1 to 6 are respectively given the same symbols and duplicated descriptions thereof may be omitted. The radio communication system according to the present embodiment has a transmitter 207 and a receiver 307.

<Transmitter 207>

The transmitter 207 has the information signal generator 4; a BPSK modulation circuit 28; transmission blocks 2071 and 2072; and the transmission antennas 1 and 2. In the transmitter 207, the BPSK modulation circuit 28 converts the information signal outputted from the information signal generator 4 into a binary digital signal. The multiplier 7 in the transmission block 2071 multiplies the orthogonal code #1 by the binary digital signal, and outputs the result of the multiplication. The multipliers 13 and 14 respectively multiply the result of the multiplication by cos $\omega_p t$ and sin $\omega_p t$. Note that $\omega_p$ is, similar to that of the first embodiment, the rotational angular frequency of the rotational polarization.

A clock circuit 219 outputs a clock signal of a carrier frequency $f_c$. Delta sigma circuits 217 and 218 respectively sample the output signals of the multipliers 13 and 14 at the carrier frequency $f_c$. Bandpass filters 15 and 16 respectively extract frequency components near the carrier frequency $f_c$ out of (remove harmonic components from) the output signals of the delta sigma circuits 217 and 218, and feed the extracted signals to the transmission antennas 1 and 2. As a result, the transmission antennas 1 and 2 transmit a rotationally polarized electromagnetic wave whose plane of polarization rotates at the rotational angular frequency $\omega_p$ and whose carrier frequency is $f_c$.

In a transmission block 2072, the multiplier 8 multiplies the orthogonal code #2 by the binary digital signal, and outputs the result of the multiplication. Clock circuits 221 and 222 respectively output clock signals of a carrier frequency $f_c - f_p$ and a carrier frequency $f_c + f_p$. Delta sigma circuits 223 and 224 sample the output signals of the multiplier 8 respectively at the carrier frequency $f_c - f_p$ and the carrier frequency $f_c + f_p$. Bandpass filter 25 extracts frequency component near the carrier frequency $f_c - f_p$ out of (remove harmonic components from) the output signal of the delta sigma circuit 223, and feeds the extracted signal to the transmission antenna 1. Bandpass filter 26 extracts frequency component near the carrier frequency $f_c+f_p$ out of (remove harmonic components from) the output signal of the delta sigma circuit 224, and feeds the extracted signal to the transmission antenna 2. As a result, the transmission antenna 1 transmits a linearly polarized electromagnetic wave whose carrier frequency is $f_c-f_p$ and whose plane of polarization is fixed, and the transmission antenna 2 transmits a linearly polarized electromagnetic wave whose carrier frequency is $f_c+f_p$ and whose plane of polarization is fixed, to propagate the information signal spread with the orthogonal code #2.

<Receiver 307>

The receiver 307 has, similarly to the receiver 302 (see FIG. 2) of the second embodiment, the three reception antennas 61, 62, and 63, which are spatially orthogonal to one another; and the polarization rotation circuit 60 that virtually forms two spatially orthogonal antennas by applying angular weighting on the three reception signals from the reception antennas 61, 62, and 63, to convert the three reception signals into two pseudo reception signals.

A clock circuit 272 outputs a clock signal of the carrier frequency $f_c$. A comparator 273 compares the clock signal with the pseudo reception signal (V'), and outputs the result of the comparison. The multiplier 74 multiplies the output signal of the comparator 273 by the orthogonal code #1 outputted by the orthogonal code generating circuit 71. With this processing, the information signal spread with the orthogonal code #1 is demodulated and despread. More specifically, the multiplier 74 outputs an information signal that becomes zero at non-detection angles $\theta_{z1}$, $\theta_{z2}$, . . . , and $\theta_{zn}$, in the same manner as in the second embodiments.

The clock circuits 282 and 287 output clock signals of carrier frequencies of $f_c-f_p$ and $f_c+f_p$, respectively. A comparator 283 compares the clock signal of the carrier frequency $f_c-f_p$ with the pseudo reception signal (V'), and outputs the result of the comparison. A comparator 286 compares the clock signal of the carrier frequency $f_c+f_p$ with the pseudo reception signal (H'), and outputs the result of the comparison.

The multipliers 84 and 88 respectively multiply the output signals of the comparators 283 and 286 by the orthogonal code #2 outputted by the orthogonal code generating circuit 81, and output the respective results of the multiplications, which are despread information signals.

The adder 64 combines the information signals outputted from the multipliers 84 and 88. The information signal outputted from the adder 64 is a signal which is made by separately demodulating and despreading the two electromagnetic waves and then combining the despread signals, and thus has substantially constant strength. Thus, the subtractor 65 outputs the information signal at each of the non-detection angles $\theta_{z1}$, $\theta_{z2}$, . . . , and $\theta_{zn}$, in the same manner as that of the second embodiment (see FIG. 2). The baseband block also functions in the same manner as that of the second embodiment. The baseband block 66 carries out processing on the basis of the information signal at a particular non-detection angle $\theta_{zm}$, and controls the angular weighting of the polarization rotation circuit 60 so that the information signal at the non-detection angle $\theta_{zm}$ exhibits good communication quality.

Eighth Embodiment

Figure 8:
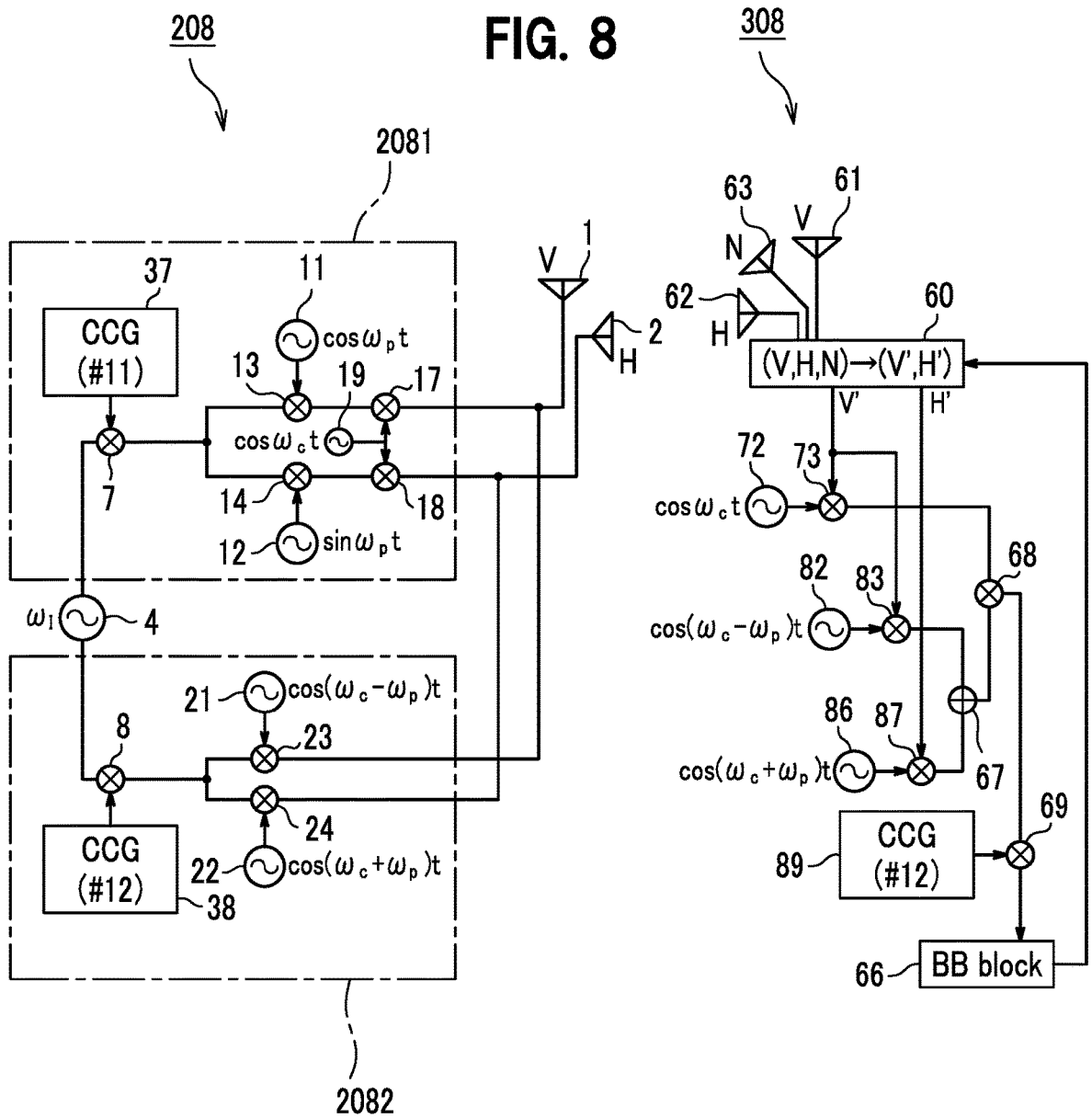
FIG. 8 is a block diagram of a radio communication system according to an eighth embodiment of the present invention.

FIG. 8 is a block diagram of a radio communication system according to an eighth embodiment of the present invention. Note that, in FIG. 8, elements corresponding to those shown in FIGS. 1 to 7 are respectively given the same symbols and duplicated descriptions thereof may be omitted. The radio communication system according to the present embodiment has a transmitter 208 and a receiver 308.

The transmitter 208 has the information signal generator 4, a transmission blocks 2081 and 2082, and the transmission antennas 1 and 2. In the transmission block 2081, a cyclic code generating circuit (denoted by CCG in the drawings) 37 outputs a cyclic code #11. The multiplier 7 multiplies the cyclic code #11 by the information signal, to spread the information signal. The configuration of the circuits located downstream of the multiplier 7 is the same as that of the transmission block 2011 (see FIG. 1) in the first embodiment. That is, the transmission block 2081 spreads the information signal with the cyclic code #11 and outputs a rotationally polarized electromagnetic wave whose carrier angular frequency is $\omega_c$ and whose plane of polarization rotates at the rotational angular frequency $\omega_p$, via the transmission antennas 1 and 2.

In the transmission block 2082, a cyclic code generating circuit 38 outputs a cyclic code #12. The cyclic code #11 and the cyclic code #12 are orthogonal to each other. The multiplier 8 multiplies the cyclic code #12 by the information signal, to spread the information signal. The configuration of the circuits located downstream of the multiplier 8 is the same as that of the transmission block 2012 in the first embodiment. That is, the transmission block 2082 outputs two linearly polarized electromagnetic waves whose carrier angular frequencies are respectively $\omega_c-\omega_p$ and $\omega_c+\omega_p$ and whose planes of polarization are fixed and orthogonal to each other, via the transmission antennas 1 and 2.

The receiver 308 has, similarly to the receiver 302 (see FIG. 2) of the second embodiment, the three reception antennas 61, 62, and 63 which are spatially orthogonal to one another; and the polarization rotation circuit 60 that virtually forms two spatially orthogonal antennas by applying angular weighting on the three reception signals from the reception antennas 61, 62, and 63, to convert the three reception signals into two pseudo reception signals.

The multiplier 73 multiplies the pseudo reception signal (V') by $\cos \omega_c t$. That is, a rotationally polarized electromagnetic wave whose carrier angular frequency is $\omega_c$ is demodulated by the multiplier 73. However, the reception strength of the rotationally polarized electromagnetic wave becomes zero at non-detection angles $\theta_{z1}$, $\theta_{z2}$, . . . , and $\theta_{zn}$, which correspond to a plurality of radio propagation paths. Thus the output signal of the multiplier 73 becomes zero at timings corresponding to the non-detection angles.

The multiplier 83 multiplies the pseudo reception signal (V') by $\cos(\omega_c-\omega_p)t$. That is, a linearly polarized electromagnetic wave whose carrier angular frequency is $\omega_c-\omega_p$ is demodulated by the multiplier 83. The multiplier 87 multiplies the pseudo reception signal (H') by $\cos(\omega_c+\omega_p)t$. That is, a linearly polarized electromagnetic wave whose carrier angular frequency is $\omega_c-\omega_p$ is demodulated by the multiplier 87.

A combination circuit 67 combines the signals outputted from the multipliers 83 and 87. The signal outputted from the combination circuit 67 is a signal obtained by separately demodulating the two electromagnetic waves and then combining the demodulated signals, and thus has substantially constant strength. A multiplier 68 multiplies the output signal of the multiplier 73 by the output signal of the combination circuit 67. A cyclic code generating circuit 89 outputs the cyclic code #12. A multiplier 69 multiplies the output signal of the multiplier 68 by the cyclic code #12, and passes the result of the multiplication to the baseband block 66.

Except at the timings corresponding to the non-detection angles $\theta_{z1}$, $\theta_{z2}$, ..., and $\theta_{zn}$, the multiplier 73 outputs the information signal spread with the cyclic code #11, and the combination circuit 67 outputs the information signal spread with the cyclic code #12. In those time periods, the output signal of the multiplier 68 is a signal which is made by spreading the information signal with a cyclic code (hereinafter referred to as cyclic code #13) that is orthogonal to both the cyclic code #11 and the cyclic code #12. Thus, the information signal is not demodulated by the multiplier 69.

Meanwhile, at the timings corresponding to the non-detection angles $\theta_{z1}$, $\theta_{z2}$, ..., and $\theta_{zn}$, the output signal of the multiplier 73 is zero, and thus the multiplier 68 outputs a signal made by spreading the information signal with the cyclic code #12. This signal is demodulated via a multiplier 69, and thus the multiplier 69 outputs the information signal at the non-detection angles $\theta_{z1}$, $\theta_{z2}$, ..., and $\theta_{zn}$. The baseband block 66 carries out processing on the basis of the information signal at a particular non-detection angle $\theta_{zm}$, and controls the angular weighting of the polarization rotation circuit 60 so that the information signal at the non-detection angle $\theta_{zm}$ exhibits good communication quality.

According to the present embodiment, the number of the code generating circuits (a total of three of the cyclic code generating circuits 37, 38, and 89) is smaller than the number of the code generating circuits in the second embodiment (a total of four of the orthogonal code generating circuits 5, 6, 71, and 81). This allows the radio communication system to have reduced amount of digital signal processing in the receiver 308, so that the receiver 308 can be reduced in size and power consumption.

Ninth Embodiment

Figure 9:
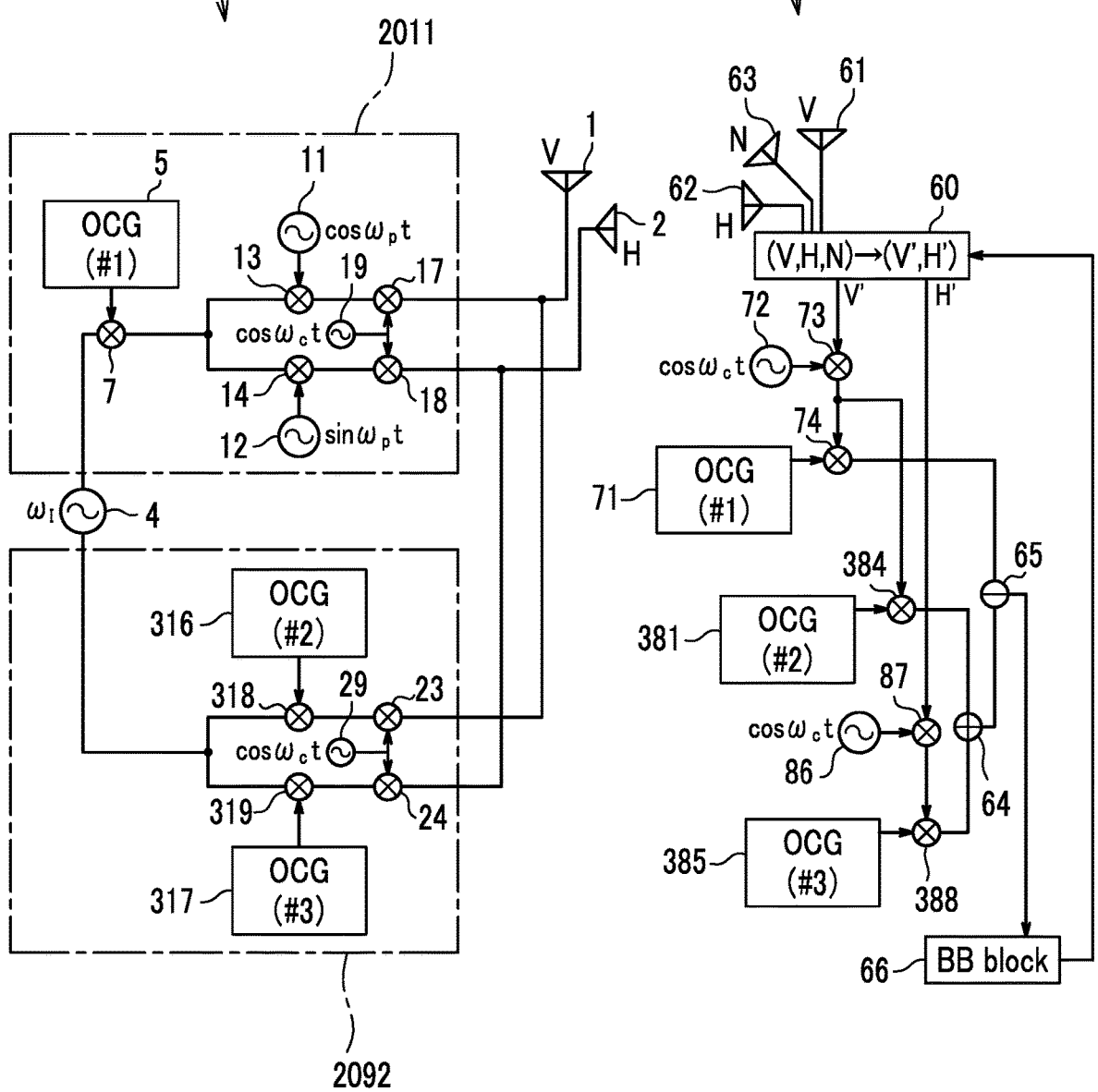
FIG. 9 is a block diagram of a radio communication system according to a ninth embodiment of the present invention.

FIG. 9 is a block diagram of a radio communication system according to a ninth embodiment of the present invention. Note that, in FIG. 9, elements corresponding to those shown in FIGS. 1 to 8 are respectively given the same symbols and duplicated descriptions thereof may be omitted. The radio communication system according to the present embodiment has a transmitter 209 and a receiver 309.

The transmitter 209 has the information signal generator 4, the transmission block 2011, a transmission block 2092, and the transmission antennas 1 and 2. First, the transmission block 2011 is the same as that of the first embodiment (see FIG. 1). That is, the transmission block 2011 spreads information signal with the orthogonal code #1 and outputs a rotationally polarized electromagnetic wave whose carrier angular frequency is $\omega_c$ and whose plane of polarization rotates at the rotational angular frequency $\omega_p$, via the transmission antennas 1 and 2.

In the transmission block 2092, orthogonal code generating circuits 316 and 317 output the orthogonal code #2 and an orthogonal code #3 (third orthogonal code) which are orthogonal to each other. The orthogonal codes #2 and #3 are each also orthogonal to the orthogonal code #1. A carrier frequency cosine oscillator 29 outputs cos $\omega_c t$. The multiplier 318 multiplies the signal outputted from the information signal generator 4 by the orthogonal code #2, and outputs the information signal spread with the orthogonal code #2. The multiplier 319 multiplies the signal outputted from the information signal generator 4 by the orthogonal code #3, and outputs the information signal spread with the orthogonal code #3.

The multiplier 23 multiplies the output signal of the multiplier 318 by cos $\omega_c t$, and feeds the result of the multiplication to the transmission antenna 1. The multiplier 24 multiplies the output signal of the multiplier 319 by cos $\omega_c t$, and feeds the result of the multiplication to the transmission antenna 2. As a result, the transmission block 2092 outputs two linearly polarized electromagnetic waves whose carrier angular frequencies are $\omega_c$ and whose planes of polarization are fixed and orthogonal to each other, via transmission antennas 1 and 2.

A receiver 309 has, similarly to the receiver 302 (see FIG. 2) of the second embodiment, the three reception antennas 61, 62, and 63, which are spatially orthogonal to each other; and the polarization rotation circuit 60 that virtually forms two spatially orthogonal antennas by applying angular weighting on the three reception signals from the reception antennas 61, 62, and 63, to convert the three reception signals into two pseudo reception signals.

The carrier frequency cosine oscillator 72 outputs cos $\omega_c t$, and the multiplier 73 multiplies the pseudo reception signal (V') by cos $\omega_c t$. The multiplier 74 multiplies the orthogonal code #1 outputted from the orthogonal code generating circuit 71 by the output signal of the multiplier 73. The multiplier 73 demodulate the electromagnetic waves whose carrier angular frequency is $\omega_c$, and the result of the demodulation is despread with the orthogonal code #1 at the multiplier 74. Here, the electromagnetic wave spread with the orthogonal code #1 is one generated by the transmission block 2011 and rotationally polarized via the transmission antennas 1 and 2. The reception strength of the rotationally polarized electromagnetic wave spread with orthogonal code #1 becomes zero at non-detection angles $\theta_{z1}$, $\theta_{z2}$, ..., and $\theta_{zn}$, which correspond to a plurality of radio propagation paths. Thus, the output signal of the multiplier 74 becomes zero at timings corresponding to the non-detection angles.

A multiplier 384 multiplies the orthogonal code #2 outputted from an orthogonal code generating circuit 381 by the output signal of the multiplier 73. With this processing, the output signal of the multiplier 73 is despread with the orthogonal code #2. The carrier frequency cosine oscillator 86 outputs cos $\omega_c t$, and the multiplier 87 multiplies the pseudo reception signal (H') by cos $\omega_c t$. A multiplier 388 (third despreading section) multiplies an orthogonal code #3 outputted from an orthogonal code generating circuit 385 by the output signal of the multiplier 87. The information signal outputted from the adder 64 is a signal obtained by separately demodulating and despreading the two electromagnetic waves and then combining the despread signals, and thus has substantially constant strength.

Thus, the subtractor 65 outputs the information signal at each of the non-detection angles $\theta_{z1}$, $\theta_{z2}$, ..., and $\theta_{zn}$, in the same manner as that of the second embodiment (see FIG. 2). The baseband block 66 also functions in the same manner as that of the second embodiment. The baseband block 66 carries out processing on the basis of the information signal at a particular non-detection angle $\theta_{zm}$, and controls the angular weighting of the polarization rotation circuit 60 so that the information signal at the non-detection angle $\theta_{zm}$ exhibits good communication quality.

According to the present embodiment, the number of the oscillators included in the transmitter 209 is smaller than that in the transmitter 201 (see FIG. 1) of the first and second embodiments.

In FIG. 9, the carrier frequency cosine oscillators 19 and 29 are illustrated as separate elements. However, because their oscillation frequencies are the same, a single oscillator can be used as the carrier frequency cosine oscillators 19 and 29. This allows the devices to be reduced in size and power consumption.

Tenth Embodiment

Figure 10:
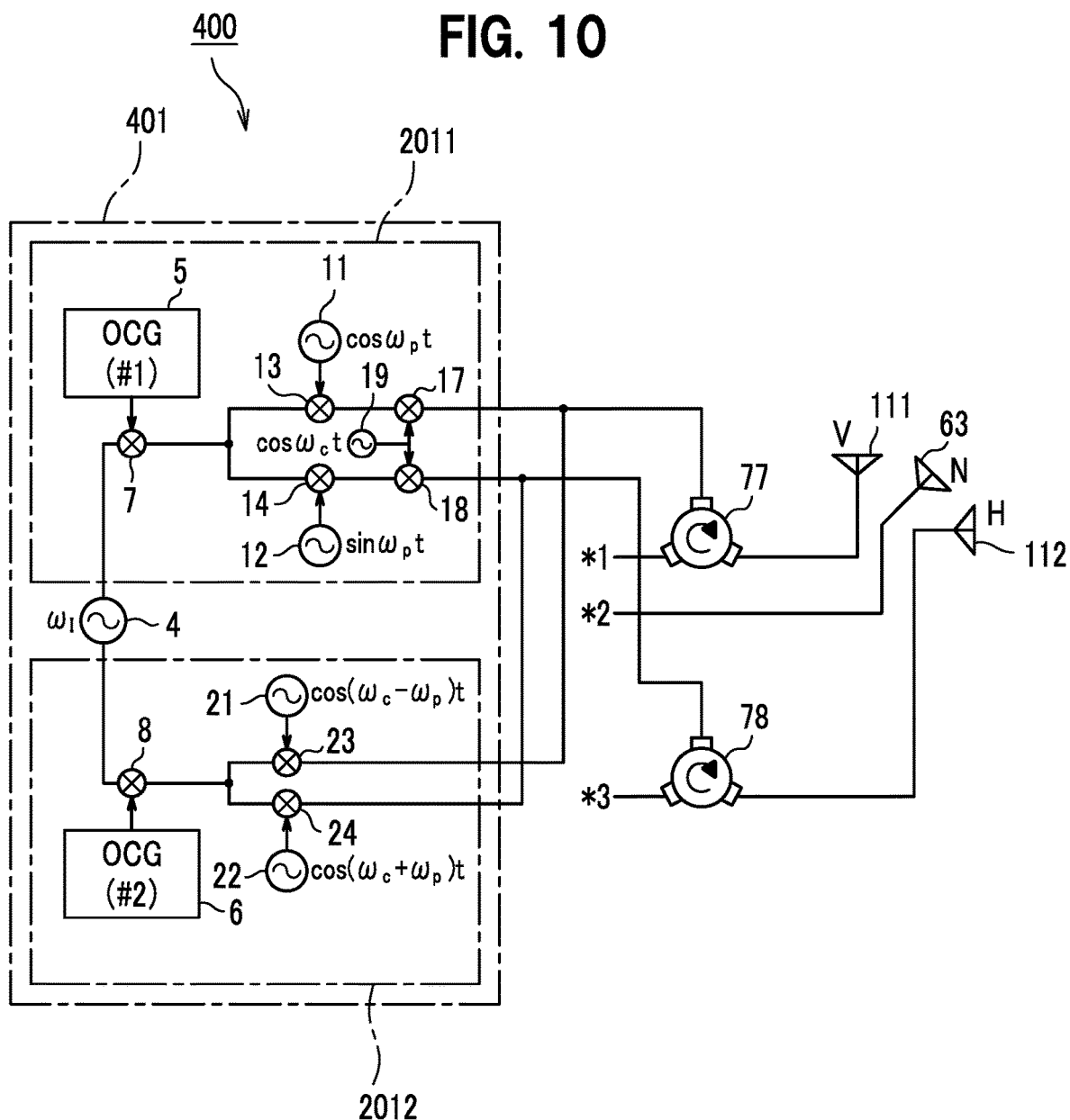
FIG. 10 is a block diagram (1/2) of a transceiver according to a tenth embodiment of the present invention.
Figure 11:
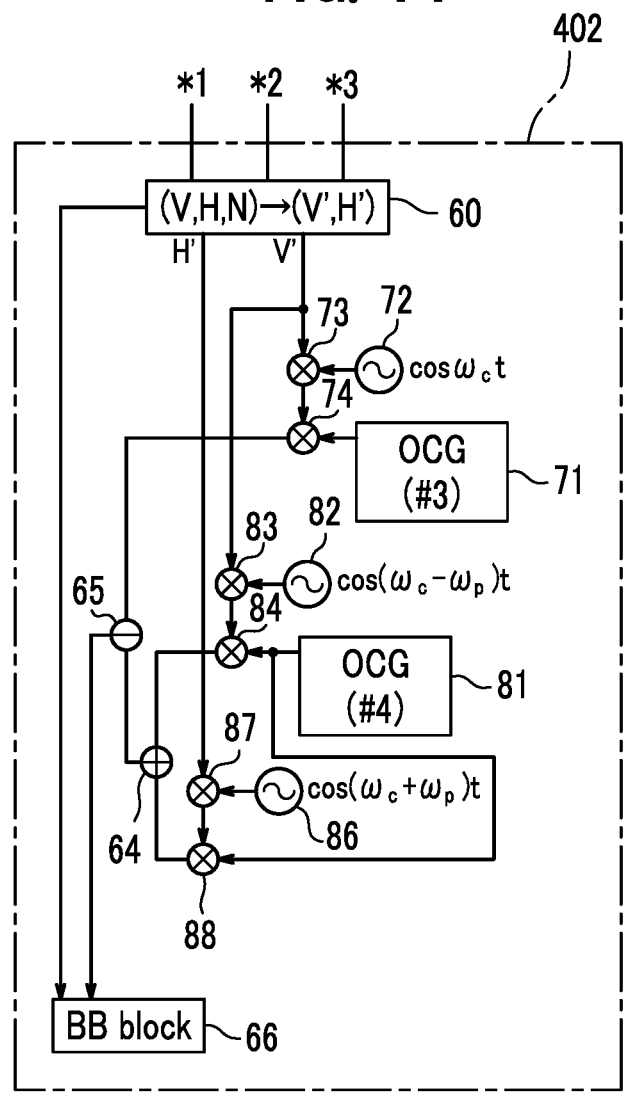
FIG. 11 is a block diagram (2/2) of the transceiver according to the tenth embodiment of the present invention.

FIGS. 10 and 11 are block diagrams of a radio communication system according to a tenth embodiment of the present invention. Note that, in FIGS. 10 and 11, elements corresponding to those shown in FIGS. 1 to 9 are respectively given the same symbols and duplicated descriptions thereof may be omitted. The radio communication system according to the present embodiment has two transceivers that perform bidirectional communication. In FIGS. 10 and 11, only a transceiver 400, one of the two transceivers, is shown. The transceiver 400 and the not-shown transceiver on the other end have the same configuration except that their spreading codes for transmission are different from each other. That is, the transceiver 400 uses orthogonal codes #1 and #2 as spreading codes for transmission, and the transceiver on the other end uses orthogonal codes #3 and #4 as spreading codes for transmission. Note that the orthogonal codes #1 to #4 are orthogonal to one another.

In FIG. 10, the transceiver 400 has a transmission block 401, circulators 77 and 78, transmission and reception antennas 111 and 112, and a reception antenna 63. The transmission and reception antennas 111 and 112, and the reception antenna 63 are spatially orthogonal to one another. The transmission block 401 has the transmission blocks 2011 and 2012 having the same configurations as the transmitter 201 (see FIG. 1) of the first embodiment, and has the information signal generator 4. In the present embodiment, the transmission signals outputted from the transmission blocks 2011 and 2012 are passed to the circulators 77 and 78.

The circulators 77 and 78 each rotate the inputted high-frequency signal in a clockwise direction in a plane corresponding to the drawing plane of FIG. 10. Thus, the transmission signals passed to the circulators 77 and 78 are transmitted to the transceiver (not shown) on the other end, respectively via the transmission and reception antennas 111 and 112. The transmission and reception antennas 111 and 112, and reception antenna 63 receive electromagnetic waves transmitted from the transceiver on the other end. The electromagnetic waves received by the transmission and reception antennas 111 and 112 are outputted via the circulators 77 and 78 as reception signals *1 and *3. The electromagnetic wave received by the reception antenna 63 is outputted as is as reception signal *2.

The transceiver 400 has a receive block 402 shown in FIG. 11. The reception signals *1, *2, and *3 are passed to the receive block 402. The receive block 402 has the same configuration as that of the receiver 302 (see FIG. 2) of the second embodiment, except that, in the receive block 402, the orthogonal code generating circuits 71 and 81 respectively output orthogonal codes #3 and #4, in tune with the orthogonal codes for transmission of the not-shown transceiver on the other end.

The configuration of the second embodiment (see FIG. 2) is one for unidirectional communication. Thus, in order to perform bidirectional communication, two sets of the transmitter 201 and the receiver 302 are necessary. Compared with this configuration, the configuration of the present embodiment requires smaller number of antennas because the transmission and reception antennas 111 and 112 can be shared between the transmission block 401 and the receive block 402, so that the device can be reduced in size and produced at a low cost, and can have a higher degree of freedom for installation location of the device.

Eleventh Embodiment

Figure 12:
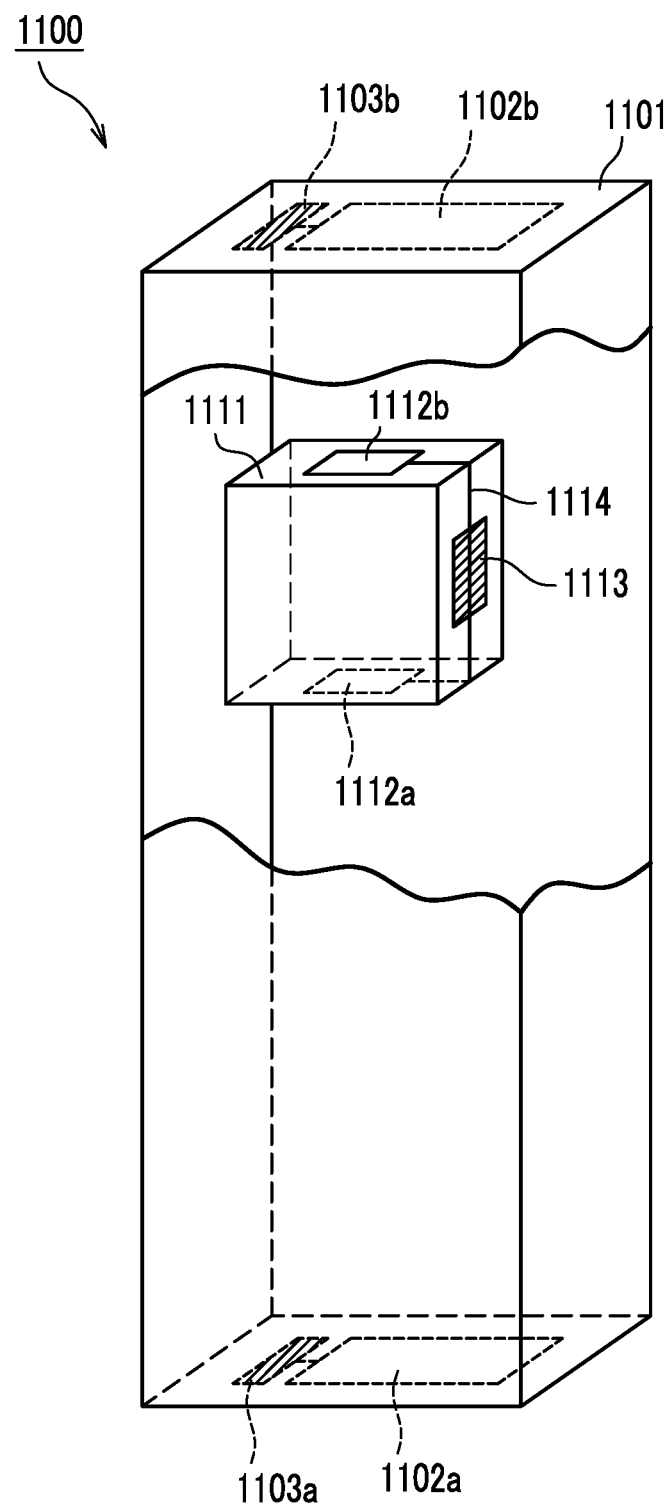
FIG. 12 is a schematic view of an elevator system according to an eleventh embodiment of the present invention.

Next, FIG. 12 is an schematic view of an elevator system 1100 according to an eleventh embodiment of the present invention.

The elevator system 1100 of the present embodiment includes a building 1101 and an elevator car 1111 that moves up and down in the building 1101. The building 1101 is arranged with a base station radio 1103a and an antenna 1102a, which are disposed on a floor of the building 1101. The building 1101 is arranged with a base station radio 1103b and an antenna 1102b, which are disposed on a ceiling of the building 1101.

Attached to the elevator car 1111 are antennas 1112a and 1112b, a terminal radio 1113, and a high-frequency cable 1114 connecting the foregoing. The base station radios 1103a and 1103b, terminal radio 1113, and the antennas 1102a, 1102b, 1112a, and 1112b are, for example, configured similarly to the transceiver 400 (see FIGS. 10 and 11) in the tenth embodiment. With this configuration, the terminal radio 1113 bidirectionally transmits and receives information signals to/from the base station radios 1103a and 1103b, using linearly polarized electromagnetic waves and rotationally polarized electromagnetic waves.

In the present embodiment, base station radios 1103a and 1103b and the terminal radio 1113 communicate with each other through the inside of the building 1101 serving as radio transmission medium. Thus, inner walls of the building 1101 and outer walls of the elevator car 1111 present a multi-path interference environment in which electromagnetic waves are subjected to multiple reflections. In addition, the propagation paths of the electromagnetic waves can be altered due to interference by an artificial operation from the outside. The present embodiment can, similarly to the above-described embodiments, reduce the correlation of a plurality of radio propagation paths and have strong resistance to obstacles and interference by the plurality of radio propagation paths caused by a natural event or an artificial operation, to provide appropriate communication. Accordingly, the present embodiment allows for eliminating wired communication means such as cables, to achieve the same transportability with a smaller building volume or allow the elevator car 1111 to have increased dimensions for the same building volume, resulting in improving the transportability.

Twelfth Embodiment

FIG. 13 is an schematic view of a substation facility monitoring system 1200 according to a twelfth embodiment of the present invention.

The substation facility monitoring system 1200 of the present embodiment includes a plurality of substation facilities 1201 and a plurality of base station devices 1211. The number of the base station devices 1211 is smaller than the number of the substation facilities 1201.

Each substation facility 1201 is provided with a terminal station radio 1203 and an antenna 1202. Each base station device 1211 has an antenna 1212 and a base station radio 1213.

The base station radios 1213, the antennas 1212, the terminal station radios 1203, and the antennas 1202 are, for example, each configured similarly to the transceiver 400 (see FIGS. 10 and 11) of the tenth embodiment. With this configuration, each terminal station radio 1203 bidirectionally transmits and receives information signals to/from any of the base station radios 1213, using linearly polarized electromagnetic waves and rotationally polarized electromagnetic waves.

The substation facilities 1201 each have dimensions of the order of several meters, which are significantly larger than the wavelengths corresponding to the frequencies of the electromagnetic waves used by the base station radios 1213 and the terminal station radios 1203, which range from several hundred MHz to several GHz. Thus, substation facilities 1201 present a multi-path interference environment in which electromagnetic waves outputted by the terminal station radios 1203 and the base station radios 1213 are subjected to multiple reflections.

In addition, propagation paths of electromagnetic waves can be altered due to interference by an artificial operation from the outside. The present embodiment can, similarly to the above-described embodiments, reduce the correlation of a plurality of radio propagation paths and have strong resistance to obstacles and interference of the plurality of radio propagation paths caused by a natural event or an artificial operation, to provide appropriate communication. The present embodiment eliminates problems due to high-voltage induction power that may occur when wired connecting means such as cables are used, and eliminates the cost of laying such cables, leading to improving safety and reducing cost when constructing control and monitor systems of the substation facilities 1201.

Modifications

The present invention is not limited to the above-described embodiments, and various modifications are possible. The above-described embodiments are exemplified to describe the present invention in an easily understandable manner, and the present invention is not limited to those including all of the described components. In addition, a part of the configuration of a certain embodiment may be replaced with a part of the configuration of another embodiment, and the configuration of a certain embodiment may be added with a configuration of another embodiment. Further, a part of the configuration in each of the embodiments may be deleted, added or replaced with other configuration. Examples of possible modifications of the above-described embodiments include the following.

(1) Receivers, transmitters, and transceivers presented in the first to tenth embodiments may be implemented using DSPs or discrete circuits.

Application specific integrated circuits (ASICs) or field-programmable gate arrays (FPGAs) may also be used.

(2) Receivers, transmitters, and transceivers presented in the first to tenth embodiments may be applicable to various systems other than the elevator system 1100 presented in the eleventh embodiment and the substation facility monitoring system 1200 presented in the twelfth embodiment.

REFERENCE SIGNS LIST

1, 2 transmission antenna
4 information signal generator
5, 6 orthogonal code generating circuit
7 multiplier (first superimposing circuit)
8 multiplier (second superimposing circuit)
9 synchronization signal generating circuit
11 polarization rotational frequency cosine oscillator (polarization plane rotating oscillator)
12 polarization rotational frequency sine oscillator (polarization plane rotating oscillator)
19 carrier frequency cosine oscillator (carrier oscillator)
27 signal switching circuit
31 carrier frequency sine oscillator (first sine oscillator)
32 carrier frequency sine oscillator (second sine oscillator)
41 carrier frequency cosine oscillator (first cosine oscillator)
42 carrier frequency cosine oscillator (second cosine oscillator)
61, 62, 63 reception antenna
65 subtractor (restoration section)
71 orthogonal code generating circuit (first despreading section)
73 multiplier (first receive section)
74 multiplier (first despreading section)
81 orthogonal code generating circuit (second despreading section)
83, 87 multiplier (second receive section)
84, 88 multiplier (second despreading section)
201, 203, 204, 205, 207, 208, 209 transmitter
301, 302, 303, 304, 306, 307, 308, 309 receiver
385 orthogonal code generating circuit (third despreading section)
388 multiplier (third despreading section)
2011, 2031, 2071, 2081 transmission block (first transmission block)
2012, 2032, 2042, 2072, 2082, 2092 transmission block (second transmission block)
$\omega_1$ angular frequency (carrier frequency, first frequency)
$\omega_2$ angular frequency (carrier frequency, second frequency)
$\omega_c$ carrier angular frequency (carrier frequency)
$\omega_p$ rotational angular frequency (rotational frequency)
$\theta_{z1}, \theta_{z2}, \ldots, \theta_{zn}$, non-detection angle
$\omega_I$ angular frequency
1 orthogonal code (first orthogonal code)
2 orthogonal code (second orthogonal code)
3 orthogonal code (third orthogonal code)
V', H' pseudo reception signal

The invention claimed is:

1. A transmitter comprising:
a first transmission block that generates a first radio wave having an information signal modulated thereon and having a plane of polarization that rotates; and
a second transmission block that generates a second radio wave having the information signal modulated thereon and having a plane of polarization that is fixed,
wherein the first transmission block comprises a first superimposing circuit that causes a first orthogonal code to be superimposed on the first radio wave, the first orthogonal code being a spreading code,
wherein the second transmission block comprises a second superimposing circuit that causes a second orthogonal code to be superimposed on the second radio wave, the second orthogonal code being orthogonal to the first orthogonal code,
wherein the first transmission block and the second transmission block respectively generate the first radio wave and the second radio wave at the same time,
wherein the first transmission block comprises:
a polarization plane rotating oscillator that oscillates at a frequency corresponding to a rotational frequency of the plane of polarization of the first radio wave, and
a carrier oscillator that oscillates at a frequency corresponding to a carrier frequency of the first radio wave, and
wherein the second radio wave has a component with a frequency equal to the sum of the carrier frequency and the rotational frequency and has a component with a frequency equal to the difference between the carrier frequency and the rotational frequency.

2. The transmitter of claim 1, further comprising:
an information signal generator that generates the information signal;
a synchronization signal generating circuit that generates a synchronization signal; and
a signal switching circuit that selects one of the information signal and the synchronization signal, and passes the selected signal to the first transmission block and the second transmission block.

3. The transmitter of claim 1, further comprising a plurality of transmission antennas whose planes of polarizations are spatially orthogonal to one another,
wherein the first transmission block generates the first radio wave via the plurality of transmission antennas, and
wherein the second transmission block generates the second radio wave via the plurality of transmission antennas.

4. A transmitter comprising:
a first transmission block that generates a first radio wave having an information signal modulated thereon and having a plane of polarization that rotates; and
a second transmission block that generates a second radio wave having the information signal modulated thereon and having a plane of polarization that is fixed,
wherein the first transmission block comprises a first superimposing circuit that causes a first orthogonal code to be superimposed on the first radio wave, the first orthogonal code being a spreading code,
wherein the second transmission block comprises a second superimposing circuit that causes a second orthogonal code to be superimposed on the second radio wave, the second orthogonal code being orthogonal to the first orthogonal code,
wherein the first transmission block and the second transmission block respectively generate the first radio wave and the second radio wave at the same time,
wherein the first transmission block comprises:
a first sine oscillator that generates a sine wave of a first frequency;
a first cosine oscillator that generates a cosine wave of the first frequency;
a second sine oscillator that generates a sine wave of a second frequency; and
a second cosine oscillator that generates a cosine wave of the second frequency,
wherein the plane of polarization of the first radio wave rotates at a rotational frequency equal to half the difference between the first and second frequencies, and
wherein the second radio wave has a component with a carrier frequency equal to the first frequency and a component with a carrier frequency equal to the second frequency.

5. The transmitter of claim 4, further comprising a plurality of transmission antennas whose planes of polarizations are spatially orthogonal to one another,
wherein the first transmission block generates the first radio wave via the plurality of transmission antennas, and
wherein the second transmission block generates the second radio wave via the plurality of transmission antennas.

* * * * *